United States Patent
Ichikawa et al.

(10) Patent No.: US 6,339,459 B1
(45) Date of Patent: Jan. 15, 2002

(54) LIQUID CRYSTAL DISPLAY DEVICE

(75) Inventors: Takeshi Ichikawa, Hachioji; Katsumi Kurematsu, Hiratsuka; Osamu Koyama, Hachioji, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/182,456

(22) Filed: Oct. 30, 1998

(30) Foreign Application Priority Data

Nov. 6, 1997 (JP) .............................. 9-304583

(51) Int. Cl.$^7$ ...................... G02F 1/1325; G02F 1/1337
(52) U.S. Cl. ......................... 349/95; 349/130; 349/106
(58) Field of Search ................... 349/123, 130, 349/178, 143, 95, 106

(56) References Cited

U.S. PATENT DOCUMENTS

| | | | |
|---|---|---|---|
| 4,981,340 A | 1/1991 | Kurematsu et al. | 349/42 |
| 5,052,783 A | * 10/1991 | Hamada | 349/95 |
| 5,176,557 A | 1/1993 | Okunuki et al. | 445/24 |
| 5,251,050 A | 10/1993 | Kurematsu et al. | 349/38 |
| 5,600,464 A | * 2/1997 | Ohe et al. | 349/123 |
| 5,633,737 A | 5/1997 | Tanaka et al. | 349/95 |
| 5,706,021 A | 1/1998 | Kurematsu | 345/89 |
| 5,796,380 A | 8/1998 | Kurematsu | 345/96 |
| 5,816,677 A | 10/1998 | Kurematsu et al. | 362/31 |

FOREIGN PATENT DOCUMENTS

| | | |
|---|---|---|
| GB | 2 274 922 | 8/1994 |
| GB | 2 279 797 | 1/1995 |
| JP | 5-298088 | 5/1993 |
| JP | 08-114780 | 5/1996 |

* cited by examiner

Primary Examiner—Toan Ton
(74) Attorney, Agent, or Firm—Fitzpatrick, Cella, Harper & Scinto

(57) ABSTRACT

A liquid crystal display device comprises a matrix substrate in which a plurality of pixel electrodes are arrayed in a matrix pattern correspondence to colors of R (Red), G (Green), and B (Blue), an opposite substrate in which an opposite electrode is placed opposite to the pixel electrodes, and a liquid crystal material having negative dielectric anisotropy, the liquid crystal material being placed between the matrix substrate and the opposite substrate, wherein there are provided an alignment layer of polyimide with a vertical alignment property and a microlens array having a plurality of microlenses, the microlenses being provided at a pitch of two pixels relative to an array of the pixel electrodes.

5 Claims, 19 Drawing Sheets

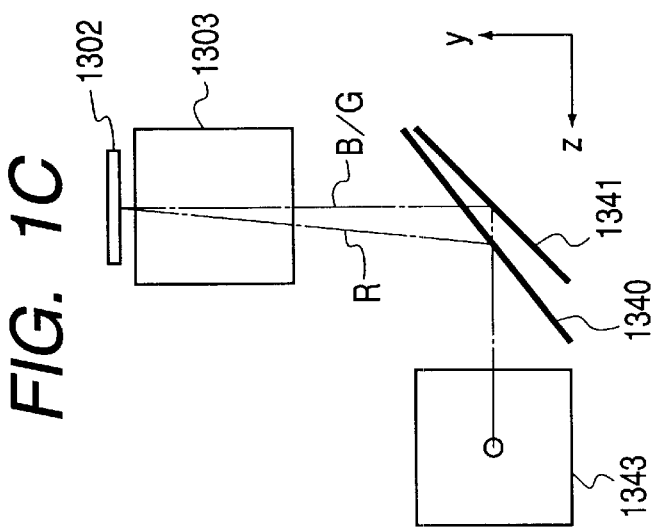
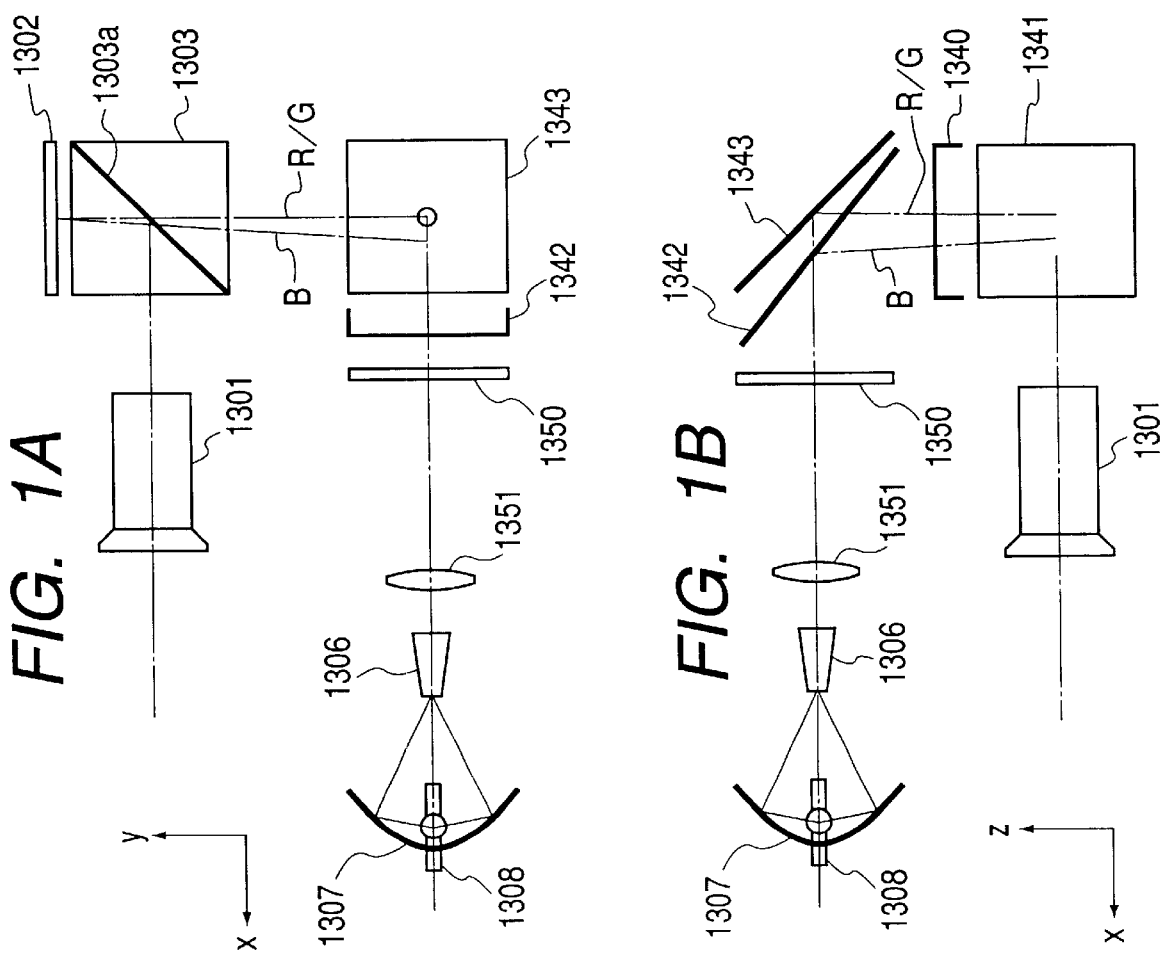

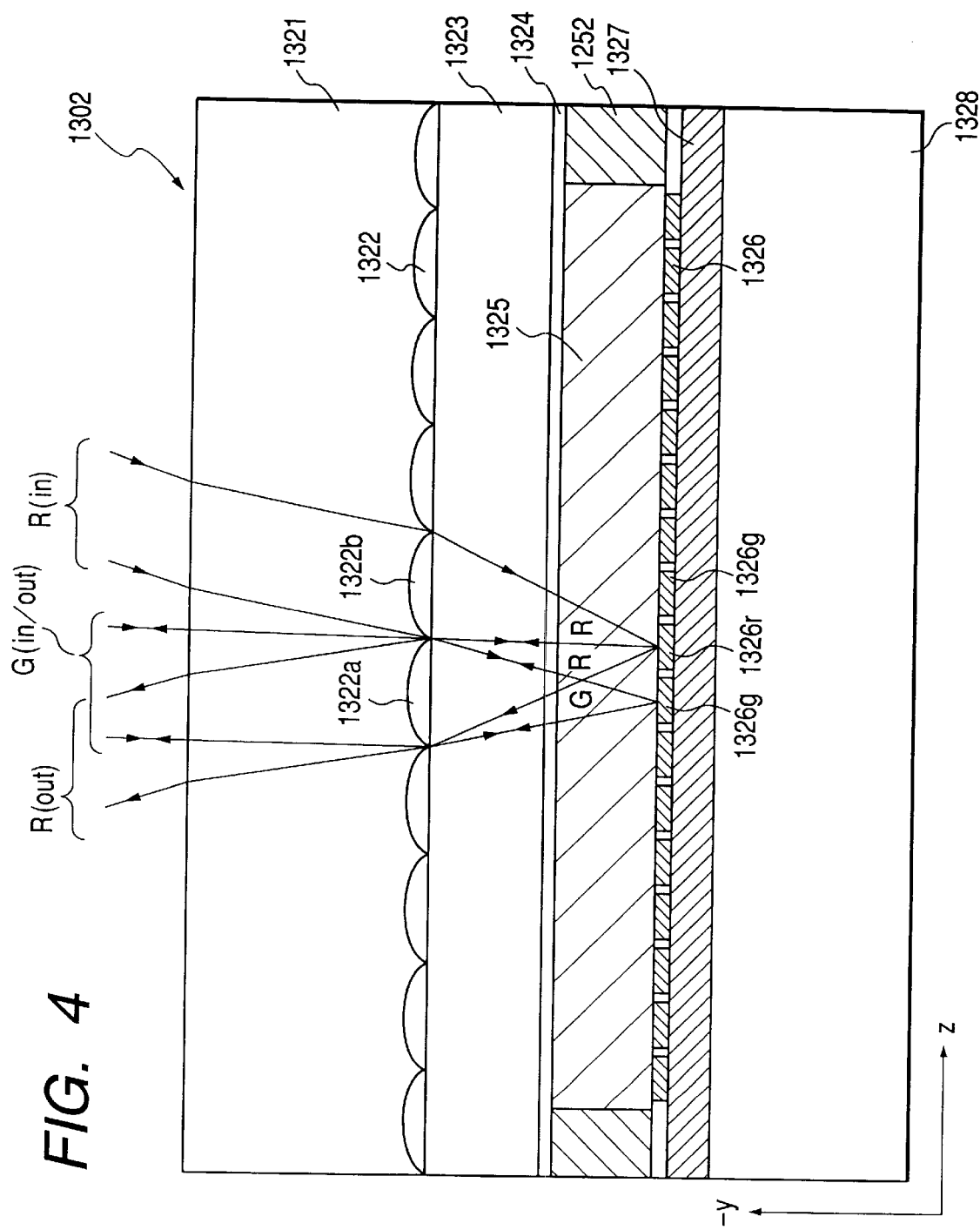

RGB MIXED ARBITRARY COLOR

LIQUID CRYSTAL DISPLAY DEVICE

BACKGROUND OF THE INVENTION

1. Field of the Invention

The present invention relates to a liquid crystal display device and, more particularly, to a liquid crystal display device applicable to so-called one-chip full-color liquid crystal display panels such as microlens-integrated liquid crystal display devices without a color filter.

2. Related Background Art

The world of today is in the age of multimedia, and equipment for communication by image information is becoming more and more important. Among others, the liquid crystal display devices are drawing attention because of their slimness and low power consumption and have grown to one of basic industries comparable to the semiconductors. The liquid crystal display devices are mainly used for 10-inch notebook-size personal computers at present. It is expected that the liquid crystal display devices of larger screen sizes will be used not only for the personal computers, but also for workstations and televisions for home use in future. With increase in the screen size, however, manufacturing equipment becomes expensive and, in addition, electrically exacting characteristics are demanded for driving of such large screens. The manufacturing cost will thus increase abruptly in proportion to the square to cube of the size with increasing screen size.

Recently, attention is thus drawn to a projection method for preparing a compact liquid crystal display panel and optically enlarging a liquid-crystal image to display an enlarged image. This is because the microstructure tendency of semiconductors permits decrease in the size, improvement in the characteristics, and decrease in the cost, similar to the scaling rule to improve performance and cost. From these aspects, in the case of the liquid crystal display panel of the TFT type, TFTs have to be compact and have sufficient driving force, and transition is now occurring from the TFTs using amorphous Si to those using polycrystal Si. Video signals of the resolution level conforming to the NTSC system etc. used in the ordinary televisions do not require so quick processing.

This allows not only the TFTs but also peripheral driving circuits such as shift registers or decoders to be made of polycrystal Si, whereby the liquid crystal display devices can be constructed in monolithic structure of a display region and a peripheral driving circuit region. Polycrystal Si is inferior to single-crystal Si, however. For realizing high-definition televisions having the higher resolution level than the NTSC system or display of the XGA (extended Graphics Array) or SXGA (Super extended Graphics Array) class in the resolution standards for computers by polycrystal Si, a shift register needs to be composed of a plurality of segments. In this case, noise, called ghost, appears in the display region at portions corresponding to borders between the segments and there are desires for a solution to this problem in this field.

On the other hand, focus is also drawn to display devices using a single-crystal Si substrate, which can realize extremely higher driving force than the display devices of the monolithic structure of polycrystal Si. In this case, the transistors of the peripheral driving circuitry have sufficient driving force and thus the divisional driving described above is not necessary. This solves the problem of the noise and the like.

A microlens-integrated liquid crystal panel and a projection-type liquid crystal display device using it are disclosed in Japanese Laid-Open Patent Application No. 8-114780, for example. The microlens-integrated liquid crystal panel in this case is normally of the transmission type and it was constructed in the structure as illustrated in FIG. 13. Specifically, illumination beams of the respective primary colors of R, G, and B are guided at mutually different angles onto the liquid crystal panel and then onto pixels 1318 different from each other by converging action of microlenses 1316. This eliminated the need for the color filter and enabled to achieve high light utilization efficiency. The projection type display device of this type can project and display a bright full-color picture even by use of the one-chip liquid crystal panel which is a single liquid crystal panel capable of creating the colors R, G, B. Such projection type display devices are gradually becoming commercially available.

On the other hand, various attempts have been made to achieve operational modes of liquid crystal of the liquid crystal panel used in the liquid crystal display apparatus, and there are operational modes including a mode using ferro-electric liquid crystal, a TN mode using nematic liquid crystal, which is relatively popularly used, an STN mode, an IPS (In-Plain-Switching) mode, a polymer-dispersed liquid crystal mode, and an electrically controlled birefringence (ECB) mode for controlling birefringence of liquid crystal cell by application of an electric field. As for the ECB mode, there are three types of methods, among which the DAP (deformation of vertical aligned phase) type uses the nematic liquid crystal having negative dielectric anisotropy. Namely, the liquid crystal in the initial state is in vertical alignment (homeotropic alignment) and the liquid crystal molecules become inclined with application of voltage to change incident, linearly polarized light into elliptically polarized light by the birefringence effect, thereby achieving gradation display. This method has steep voltage-reflectance characteristics and black is easy to create in the normally black mode by use of orthogonal polarizers. Therefore, this method can implement high-contrast liquid crystal display.

For use of the liquid crystal apparatus of the DAP mode, it is important to uniformly align longitudinal axes of liquid crystal molecules with the vertical direction to the substrate in the initial stage and how uniformly and stably angles and directions of pretilt of the molecules are controlled would be a key to enhancing the contrast and in-plane uniformity which represent the performance of the liquid crystal display apparatus. A method known for implementing such vertical alignment is, for example, application of such an amphiphilic surface-active agent as lecithin or organic silane (Liquid crystal-applications, p61, coauthored by Koji Okano and Shunsuke Kobayashi, Baifukan).

A variety of oblique evaporation methods and rubbing methods are normally used as methods for controlling the pretilt angles of liquid crystal molecules at elevations of about 1 to 5 degrees relative to an alignment layer surface, and there is also a recent report to suggest a method for controlling alignment by irradiating the vertical alignment layer with ultraviolet rays. Among these the rubbing methods are techniques excellent in mass productivity and cost efficiency, which are often used in practice.

The vertical alignment layers, however, still have the problems that their wettability is poor, that it is hard to form the layers stably in uniform thickness and quality of film, and it is hard to implement reliable control of alignment. Particularly, there are some cases in which display characteristics are degraded considerably by disturbance of alignment caused by weakness of adhesion of the alignment layers at step portions of base layer in contact with the alignment layers. In particular there is a possibility that the problem becomes significant on the occasion of rubbing for the pretilt control.

Further, in the case of the microlens-integrated liquid crystal panels, say the conventional example described above (FIG. 13), a projection display image thereof is an enlarged projection image of the pixels 1318 of R, G, and B on the screen and, therefore, the mosaic pattern of R, G, and B becomes prominent as illustrated in FIG. 14. This could degrade the quality of display image.

SUMMARY OF THE INVENTION

An object of the present invention is to provide a liquid crystal display device that can be applied to the one-chip projection type liquid crystal display apparatus and that can display a full-color projection image color-mixed in each pixel without the mosaic pattern.

Another object of the present invention is to provide a liquid crystal display device that can achieve high-contrast display in the DAP mode having the vertical alignment layers of polyimide with stable alignment characteristics.

Another object of the present invention is to provide a liquid crystal display device comprising a matrix substrate in which a plurality of pixel electrodes are arrayed in a matrix pattern in correspondence to colors of R (Red), G (Green), and B (Blue), an opposite substrate in which an opposite electrode is placed opposite to said pixel electrodes, and a liquid crystal material having negative dielectric anisotropy, the liquid crystal material being placed between the matrix substrate and the opposite substrate, wherein there are provided an alignment layer of polyimide with a vertical alignment property and a microlens array having a plurality of microlenses, and wherein the microlenses are provided at a pitch of two pixels relative to an array of the pixel electrodes.

The present invention embraces such a configuration that in an array of basic pixels of R, G, and B in a color-filter-less reflective liquid crystal panel, the color pixels are arrayed so that mutually different combinations of two colors out of the these three primary color pixels are arranged in a first direction and in a second direction different therefrom, a two-dimensional microlens array has microlenses at the pitch of two pixels relative to the pixel array, the first primary color pixels out of the colors R, G, B are located at positions corresponding to centers of the microlenses, the second primary color pixels are located at positions corresponding to borders between adjacent microlenses in the first direction of lines of the microlenses, the third primary color pixels are located at positions corresponding to borders between adjacent microlenses in the second direction of lines of the microlenses, a first primary color beam is made incident from a direction normal to the reflective liquid crystal panel, a second primary color beam is made incident thereto as inclined relative to the normal direction toward the first direction, and a third primary color beam is made incident thereto as inclined relative to the normal direction toward the second direction, so as to illuminate the liquid crystal panel.

In this configuration, the above illumination system is so set that the first primary color beam incident through a microlens onto a first primary color pixel is reflected thereby to return in the same optical path, while the second or third primary color beam incident obliquely through a certain microlens onto a second or third primary color pixel is reflected by the pixel located at the border of the microlenses and is emergent from a microlens adjacent thereto. In connection therewith, it is preferable to select a combination of each set of R, G, and B pixels composing each picture element against each microlens position as follows. In each of the second and third primary color pixels, a pixel selected is one located in the direction of incidence of the illumination light out of the two pixels adjacent to the first primary color pixel and so selected pixels of the second and third primary colors are combined with the aforementioned first primary color pixel. Reflected beams of the respective primary colors from each set of R, G, and B pixels are modulated by the liquid crystal and thereafter are emitted through the same microlens.

When especially this microlens position in the liquid crystal panel is projected and imaged on the screen by a projecting means such as a lens, an image is projected through the modulation of the liquid crystal panel in a macroscopic sense and the R, G, B pixel images from each pixel are projected in a color-mixed state as a superimposed image in a microscopic sense.

Further, when the surface of the above active matrix substrate is flattened, the vertical alignment layer can be formed stably and the liquid crystal display device can be constructed with high contrast.

Further, the vertical alignment film may be formed in multilayer structure, in which a layer on a base metal electrode layer is a layer with high adhesion and high wettability to the base metal electrode layer and in which the outermost surface layer in contact with the liquid crystal has low surface energy. This structure permits formation of the liquid crystal panel of the DAP mode with high reliability but with little peeled-off layer, in which alignment of the liquid crystal is vertical and in which angles of pretilt are uniform.

BRIEF DESCRIPTION OF THE DRAWINGS

FIG. 1A, FIG. 1B, and FIG. 1C are overall structural diagrams to show an embodiment of an optical system of a projection type liquid crystal display device according to the present invention;

FIG. 4 is a sectional view to show a first embodiment of a liquid crystal panel according to the present invention;

DETAILED DESCRIPTION OF THE PREFERRED EMBODIMENTS

Embodiment 1

Figure 2A:
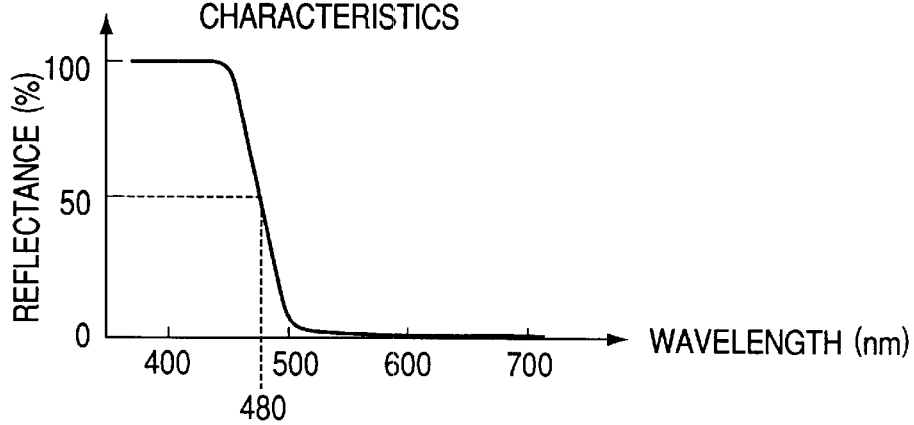
FIG. 2A, FIG. 2B, and FIG. 2C are spectral reflection characteristic diagrams of dichroic mirrors used in the optical system of the projection type liquid crystal display device according to the present invention.

FIGS. 1A to 1C are structural diagrams of an optical system of a front and back projection type liquid crystal display device using the liquid crystal display device of the present invention. FIG. 1A is a top plan view of the optical system, FIG. 1B is a front elevation thereof, and FIG. 1C is a side view thereof. In the figures, reference numeral 1301 designates a projection lens for projecting an image onto a screen, 1302 a liquid crystal panel with microlenses, 1303 a polarization beam splitter (PBS), 1340 an R (red light) reflecting dichroic mirror, 1341 a B/G (blue and green light) reflecting dichroic mirror, 1342 a B (blue light) reflecting dichroic mirror, 1343 a highly reflective mirror for reflecting light of all the colors, 1350 a Fresnel lens, 1351 a convex lens, 1306 a rod type integrator, 1307 an ellipsoidal reflector, and 1308 an arc lamp such as a metal halide lamp or UHP.

Figure 2B:
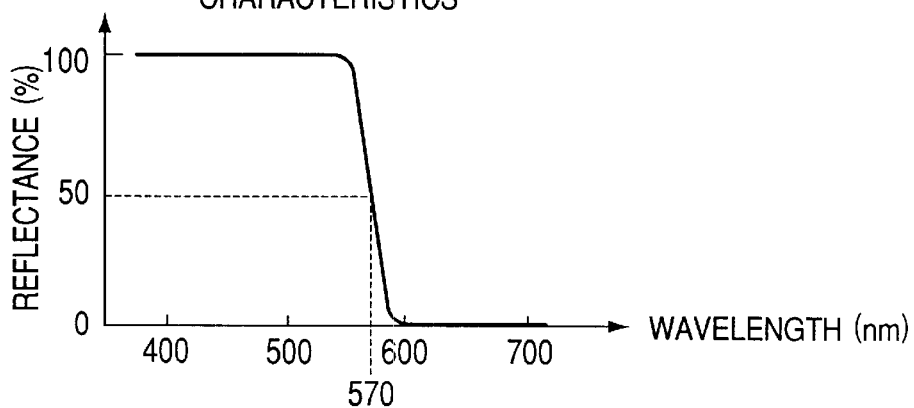
Figure 2C:
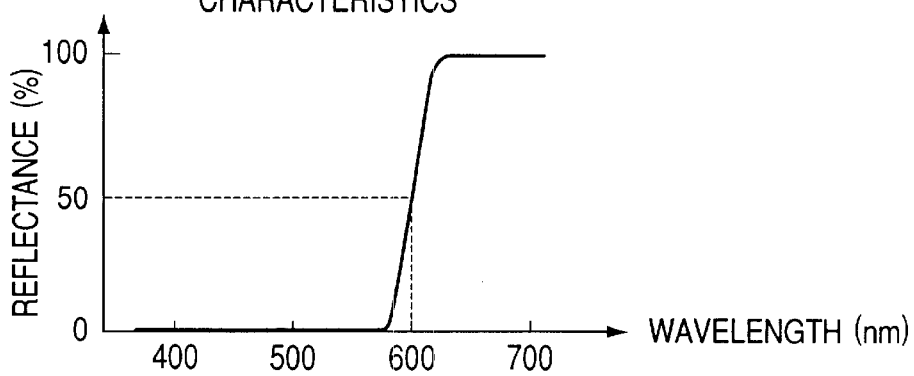
Figure 3:
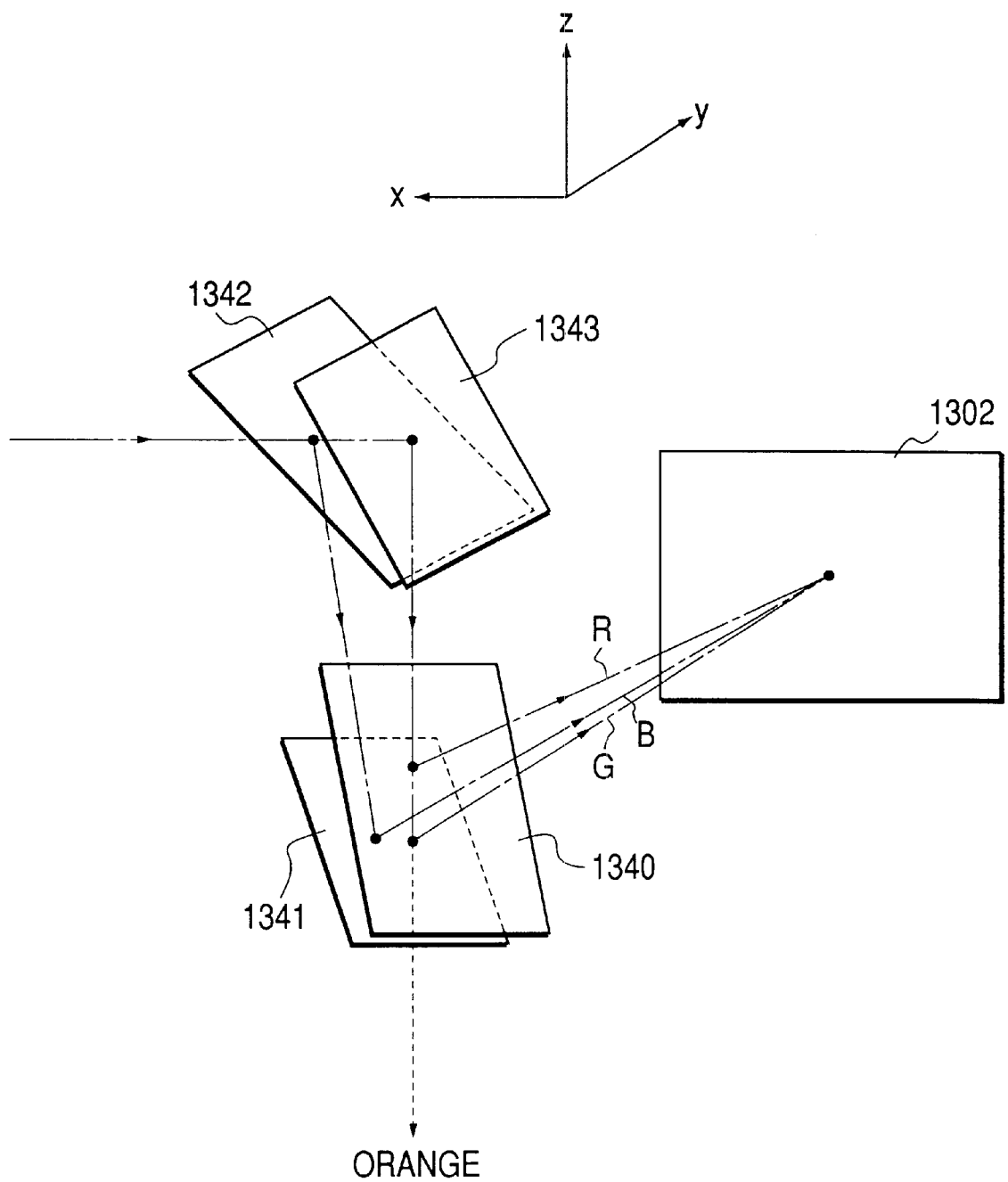
FIG. 3 is a perspective view of a color separation/illumination section in the optical system of the projection type liquid crystal display device according to the present invention.

Here, the R (red light) reflecting dichroic mirror 1340, B/G (blue and green light) reflecting dichroic mirror 1341, and B (blue light) reflecting dichroic mirror 1342 have such spectral reflection characteristics as those illustrated in FIG. 2C, FIG. 2B, and FIG. 2A, respectively. These dichroic mirrors, together with the highly reflective mirror 1343, are arranged on a three-dimensional basis as illustrated in the perspective view of FIG. 3, and they perform color separation of white illumination light into color beams of R, G, and B as detailed hereinafter and make each beam of the primary colors illuminate the liquid crystal panel 1302 in three different directions in the three-dimensional space.

The operation of the optical system will be described along the advance process of beam. First, the light emitted from the lamp 1308 of the light source is white light and the ellipsoidal reflector 1307 condenses the white light at the entrance of the integrator 1306 disposed in front thereof. As the light advances with repeating reflections in this integrator 1306, the spatial intensity distribution of the beam is uniformed. Then the beam emerging from the integrator 1306 is converted into a beam parallel to the negative direction of the x-axis (with respect to the reference in the front elevation of FIG. 1B) by the convex lens 1351 and Fresnel lens 1350. Then the parallel beam first reaches the B reflecting dichroic mirror 1342. This B reflecting dichroic mirror 1342 reflects only the B light (blue light) and the B light is directed at a predetermined angle with respect to the z-axis in the negative direction of the z-axis or downward (with respect to the reference in the front elevation of FIG. 1B) toward the R reflecting dichroic mirror 1340.

On the other hand, the beam of the colors except for the B light (i.e., the R/G light beam) passes through this B reflecting dichroic mirror 1342 and then is reflected at the right angle in the negative direction of the z-axis (downward) by the highly reflective mirror 1343 to travel toward the R reflecting dichroic mirror 1340 as well. Referring here to the front elevation of FIG. 1B, the B reflecting dichroic mirror 1342 and highly reflective mirror 1343 are arranged so as to reflect the beam (along the negative direction of the x-axis) from the integrator 1306 into the negative direction of the z-axis (downward), and the highly reflective mirror 1343 is inclined just at 450 to the x-y plane about the rotational axis of the y-axis direction. In contrast, the B reflecting dichroic mirror 1342 is set at an angle smaller than 45° with respect to the x-y plane about the rotational axis of the y-axis direction as well.

Accordingly, the R/G light reflected by the highly reflective mirror 1343 is reflected at the right angle into the negative direction of the z-axis, whereas the B light reflected by the B reflecting dichroic mirror 1342 travels downward at the predetermined angle with respect to the z-axis (with a tilt in the x-z plane). Here, shift amounts and tilt amounts of the highly reflective mirror 1343 and B reflecting dichroic mirror 1342 are selected so that the principal rays of the respective color beams intersect with each other on the liquid crystal panel 1302 in order to equalize the illumination areas of the B light and the R/G light on the liquid crystal panel 1302.

Then the R/G/B beams traveling downward (in the negative direction of the z-axis) as described above travel toward the R reflecting dichroic mirror 1340 and B/G reflecting dichroic mirror 1341. These are positioned below the B reflecting dichroic mirror 1342 and highly reflective mirror 1343. First, the B/G reflecting dichroic mirror 1341 is arranged at an inclination of 45° with respect to the x-z plane about the rotational axis of the x-axis direction. The R reflecting dichroic mirror 1340 is also set at an angle smaller than 45° with respect to the x-z plane about the rotational axis of the x-axis direction.

Therefore, among the R/G/B beams incident to these, the B/G light first passes through the R reflecting dichroic mirror 1340 and then is reflected at the right angle into the positive direction of the y-axis by the B/G reflecting dichroic mirror 1341. Then the B/G light is polarized through the PBS 1303 and thereafter illuminates the liquid crystal panel 1302 placed horizontally on the x-z plane. Among the B/G beams, the B light is traveling at the predetermined angle with respect to the x-axis (with the tilt in the x-z plane) as described previously (see FIG. 1A and FIG. 1B), and, therefore, it maintains the predetermined angle with respect to the y-axis (the tilt in the x-y plane) after reflected by the B/G reflecting dichroic mirror 1341. Then the B light illuminates the liquid crystal panel 1302 at that angle as an angle of incidence (in a direction on the x-y plane).

The G light is reflected at the right angle by the B/G reflecting dichroic mirror 1341 to travel in the positive direction of the y-axis and then is polarized through the PBS 1303. After that, the G light illuminates the liquid crystal panel 1302 at the angle of incidence of 0°, i.e., normally.

The R light is reflected into the positive direction of the y-axis by the R reflecting dichroic mirror 1340 placed in front of the B/G reflecting dichroic mirror 1341 as described previously, but the R light travels at the predetermined angle with respect to the y-axis (with the tilt in the y-z plane) in the positive direction of the y-axis as illustrated in FIG. 1C (the side view) and is polarized through the PBS 1303. After that, the R light illuminates the liquid crystal panel 1302 at this angle to the y-axis, as an angle of incidence (in a direction on the y-z plane). Shift amounts and tilt amounts of the B/G reflecting dichroic mirror 1341 and R reflecting dichroic mirror 1340 are selected so that the principal rays of the respective color beams intersect with each other on the liquid crystal panel 1302 in order to equalize the illumination areas of the R, G, B color beams on the liquid crystal panel 1302 in the same fashion as described above.

Further, the cut wavelength of the B reflecting dichroic mirror 1341 is 480 nm as illustrated in FIG. 2A, the cut wavelength of the B/G reflecting dichroic mirror 1341 is 570 nm as illustrated in FIG. 2B, and the cut wavelength of the R reflecting dichroic mirror 1340 is 600 nm as illustrated in FIG. 2C; therefore, unnecessary orange light passes through the B/G reflecting dichroic mirror 1341 to be discarded. This achieves the optimum color balance.

As described hereinafter, each R, G, B beam undergoes reflection and polarization modulation in the liquid crystal panel 1302 and then returns to the PBS 1303. Beams reflected in the positive direction of the x-axis by PBS surface 1303a of the PBS 1303 compose image light, which is enlarged and projected through the projection lens 1301 onto the screen (not illustrated). Incidentally, the R, G, B beams illuminating the liquid crystal panel 1302 have the mutually different angles of incidence, so that the R, G, B beams reflected therefrom also have different angles of emergence. The projection lens 1301 used herein is one having the lens diameter and aperture enough to capture all these beams. It is, however, noted that inclinations of the beams incident to the projection lens 1301 are rather paralleled as each color beam passes twice through the microlenses and that they thus maintain the inclinations of the incident light to the liquid crystal panel 1302.

Figures 13, 14:
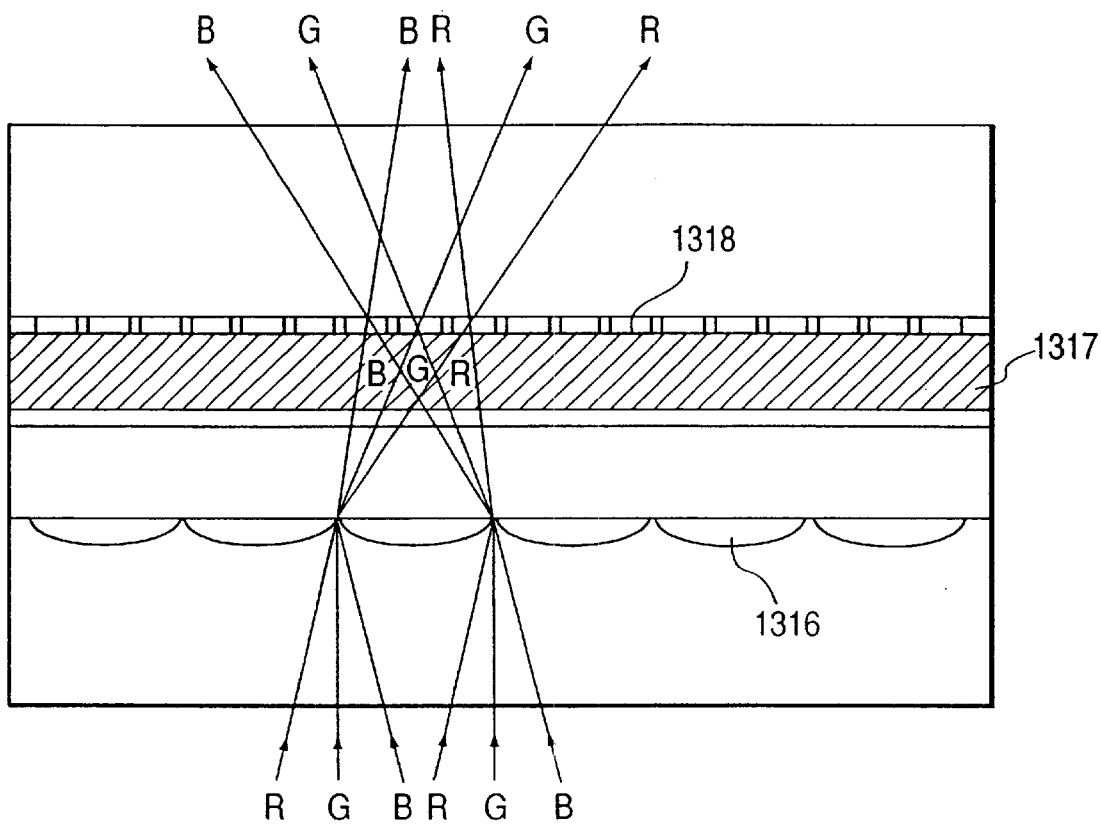
FIG. 13 is a partly enlarged, sectional view of the conventional microlens-integrated transmission type liquid crystal panel.
FIG. 14 is a partly enlarged view of a projected image on the screen in the conventional projection type liquid crystal display device using the microlens-integrated transmission type liquid crystal panel.

In the case of the transmission type panel of the conventional example as illustrated in FIG. 13, beams emerging from the liquid crystal panel diverge larger because of addition of the converging action of the microlenses and thus the projection lens for capturing these beams has to have a larger numerical aperture. The projection lens was thus an expensive one. In contrast, the spread of beams from the liquid crystal panel 1302 in the present embodiment is relatively small as discussed above, so that a sufficiently bright projected image can be obtained on the screen even by use of a projection lens having a smaller numerical aperture. Therefore, the present embodiment permits use of a cheaper projection lens. It is possible to apply to the present embodiment the example of the display method of the stripe type in which the same colors are aligned in the vertical direction as illustrated in FIG. 14, but this display method is not preferable in the case of the liquid crystal panel with the microlenses, as will be discussed hereinafter.

Next described is the liquid crystal panel 1302 of the present invention used herein. FIG. 4 is a schematic diagram of an enlarged cross section (corresponding to the y-z plane of FIGS. 1A to 1C) of the liquid crystal panel 1302. In the figure, numeral 1321 represents a microlens substrate, 1322 microlenses, 1323 a glass sheet, 1324 a transparent opposite electrode, 1325 a liquid crystal layer of the DAP mode, 1326 pixel electrodes, 1327 an active matrix driving circuit section, and 1328 a silicon semiconductor substrate. Numeral 1252 denotes a peripheral seal portion. Here, in the present embodiment the R, G, and B pixels are integrated in one panel and the size of one pixel is small. Therefore, increase of aperture ratio is significant and there exist the reflective electrodes in the region of converged light. The microlenses 1322 are formed on the surface of the glass substrate (alkaline glass) 1321 by the so-called ion exchange method and are arrayed in the two-dimensional array structure at the pitch equal to double the pitch of the pixel electrodes 1326.

Further, the liquid crystal layer 1325 employs the nematic liquid crystal of the so-called DAP mode adapted for the reflection type and is maintained in predetermined alignment by alignment layers not illustrated (which will be described hereinafter). The pixel electrodes 1326 are made of Al and also serve as a reflector. In order to increase the reflectance by improvement in the surface property, the so-called CMP treatment of the pixel electrode surface is carried out in the final step after patterning (the details of which will be described hereinafter).

The active matrix driving circuit section 1327 is a semiconductor circuit section provided on the so-called silicon semiconductor substrate 1328 and drives the above pixel electrodes 1326 in the active matrix drive manner. In the peripheral part of the circuit matrix, there are provided the gate line driver (the vertical register etc.) and the signal line driver (the horizontal register etc.) not illustrated (the details of which will be described hereinafter). These peripheral drivers and active matrix driving circuitry are constructed so as to write the video signals of the respective primary colors of R, G, and B into the predetermined R, G, B pixels, respectively. Each of the pixel electrodes 1326 does not have a color filter, but they are distinguished as R, G, B pixels by the primary color video signals written by the active matrix driving circuitry, thus forming the predetermined array of R, G, B pixels detailed hereinafter.

Let us now check the G beam illuminating the liquid crystal panel 1302. As described above, the G beam is polarized by the PBS 1303 and thereafter is incident normally to the liquid crystal panel 1302. Among rays of the G light, an example of rays incident to one microlens 1322a are illustrated by arrows G (in/out) in the figure. As illustrated herein, the G rays are condensed by the microlens 1322 to illuminate the G pixel electrode 1326g. Then the rays are reflected by the pixel electrode 1326g of Al and again pass through the same microlens 1322a to go out of the panel. As the G rays travel to go and return through the liquid crystal layer 1325 in this way, the G rays (polarized light) undergo modulation because of the action of the liquid crystal induced by an electric field established between the pixel electrode 1326g and the opposite electrode 1324 by the signal voltage applied to the pixel electrode 1326g. Then the G rays go out of the liquid crystal panel and return to the PBS 1303.

Since the quantity of the light reflected by the PBS surface 1303a and traveling toward the projection lens 1301 varies depending upon the degree of the modulation, the so-called density gradation display of each pixel is achieved thereby. On the other hand, concerning the R light incident in the oblique direction in the cross section of FIG. 4 (in the y-z plane) as described above, let us focus attention on R rays also polarized by the PBS 1303 and thereafter entering, for example, the microlens 1322b. As indicated by arrows R (in) in the figure, the rays are condensed by the microlens 1322b and then illuminate the R pixel electrode 1326r located at a position shifted to the left from the position immediately below the microlens 1322b. Then the rays are reflected by the pixel electrode 1326r and then pass through the microlens 1322a next to the microlens 1322b (in the negative z-direction) this time, as illustrated, to go out of the panel (R(out)).

On this occasion, the R rays (polarized light) also undergo modulation because of the action of the liquid crystal induced by an electric field according to an image signal, established between the pixel electrode 1326r and the opposite electrode 1324 by the signal voltage applied to the pixel electrode 1326r, then go out of the liquid crystal panel, and return to the PBS 1303. In the subsequent process, the image light is projected from the projecting lens 1301 in the same manner as in the case of the G light described above. Incidentally, in the depiction of FIG. 4 the G light and the R light appears overlapping and interfering with each other above the pixel electrode 1326g and above the pixel electrode 1326r, but this results from the enlarged and emphasized depiction of the thickness of the liquid crystal layer in the schematic diagram; such interference does not occur in practice irrespective of the pixel size, because the actual thickness of the liquid crystal layer is 1 to 5 $\mu$m, which is much smaller than 50 to 100 $\mu$m of the glass sheet 1323.

Figure 5A:
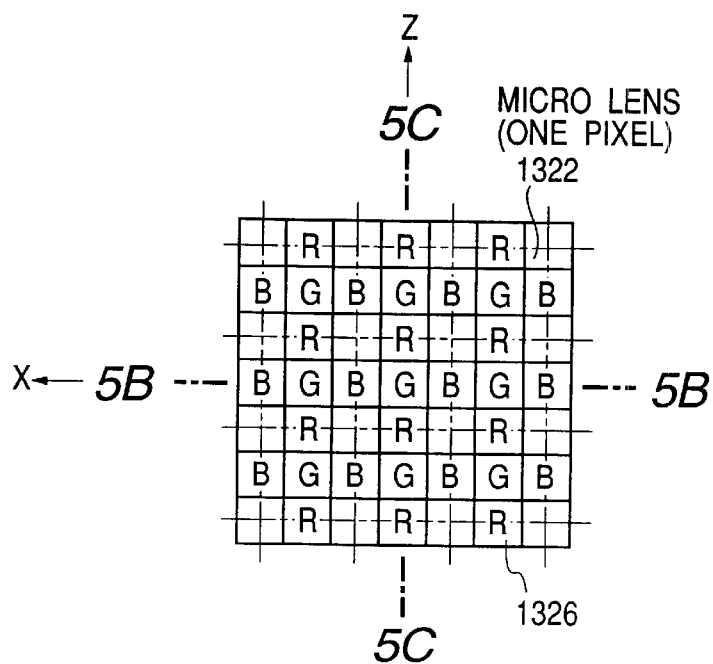
FIG. 5A, FIG. 5B, and FIG. 5C are explanatory drawings to explain the principles of color separation and color synthesis in the liquid crystal panel according to the present invention.
Figure 5C:
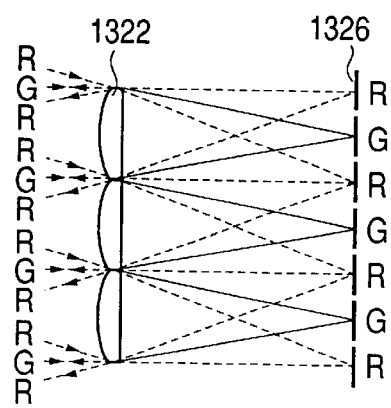
Figure 5B:
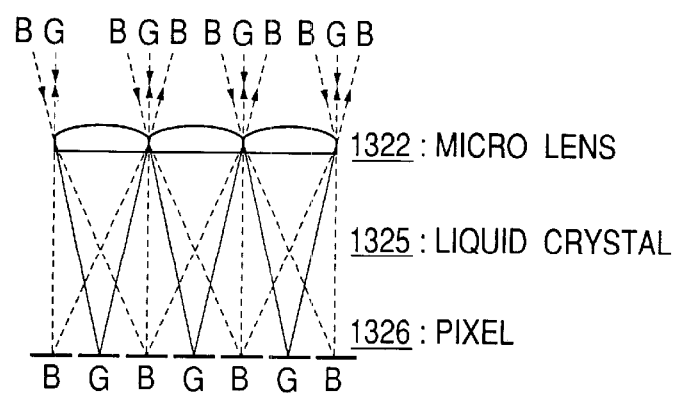

Next, FIGS. 5A to 5C are explanatory diagrams to show the principles of color separation and color synthesis in the present example. FIG. 5A is a schematic top plan view of the liquid crystal panel 1302, and FIG. 5B and FIG. 5C are schematic sectional views along 5B—5B (in the x-direction) and along 5C—5C (in the z-direction) of the schematic top plan view of the liquid crystal panel, respectively. Here, each microlens 1322 corresponds to an area covering a pixel of G light and halves of two-color pixels adjacent thereto on either side and thus corresponds to totally three pixels, as indicated by the chain lines in FIG. 5A. FIG. 5C corresponds to above FIG. 4 to show the y-z cross section, showing states of incidence and emergence of the G light and R light incident to each microlens 1322. As seen from this figure, each G pixel electrode is positioned immediately below the center of each microlens and each R pixel electrode immediately below the border between microlenses. It is thus preferable that the angle of incidence of the R light be set so that tan$\theta$ thereof may become equal to a ratio of the pixel pitch (of B & R pixels) to the distance between the microlenses and the pixel electrodes.

On the other hand, FIG. 5B corresponds to an x-y cross section of the liquid crystal panel 1302. In this x-y cross section, the B pixel electrodes and G pixel electrodes are arranged in an alternate manner, as in FIG. 5C, and each G pixel electrode is positioned immediately below the center of each microlens while each B pixel electrode is located immediately below the border between microlenses.

Incidentally, the B light to illuminate the liquid crystal panel is polarized by the PBS 1303 and thereafter enters the liquid crystal panel in the oblique direction in the cross section of FIG. 1A (in the x-y plane) as described previously, so that, in the same manner as in the case of the R light, the B rays incident to each microlens 1322 are reflected by the B pixel electrodes 1326b as illustrated and then are emergent from the microlenses 1322 adjacent in the x-direction to the incident microlenses 1322. The modulation by the liquid crystal on the B pixel electrodes 1326b and the projection of the B emergent light from the liquid crystal panel are substantially the same as those of the G light and R light described above.

Each B pixel electrode 1326b is positioned immediately below the border between microlenses and it is also preferable that the angle of incidence of the B light to the liquid crystal panel be set so that tan$\theta$ thereof may become equal to the ratio of the pixel pitch (of the G & B pixels) to the distance between the microlenses and the pixel electrodes, as was the case with the R light. Incidentally, the liquid crystal panel of the present example has the array of R, G, B pixels as described above, specifically the sequence of RGRGRG . . . in the-z-direction and the sequence of , BGBGBG . . . in the x-direction, and FIG. 5A shows the array on the plan view. As described, the size of each pixel is approximately half of the microlens both in the vertical direction and in the horizontal direction, and the pixel pitch is half that of the microlenses both in the x- and z-directions. Further, the G pixels are located immediately below the centers of the microlenses in the plan view as well, the R pixels are located between the G pixels and at the borders between the microlenses in the z-direction, and the B pixels are located between the G pixels and at the borders between the microlenses in the x-direction. The shape of one microlens unit is square (double the size of each pixel).

Figure 6:
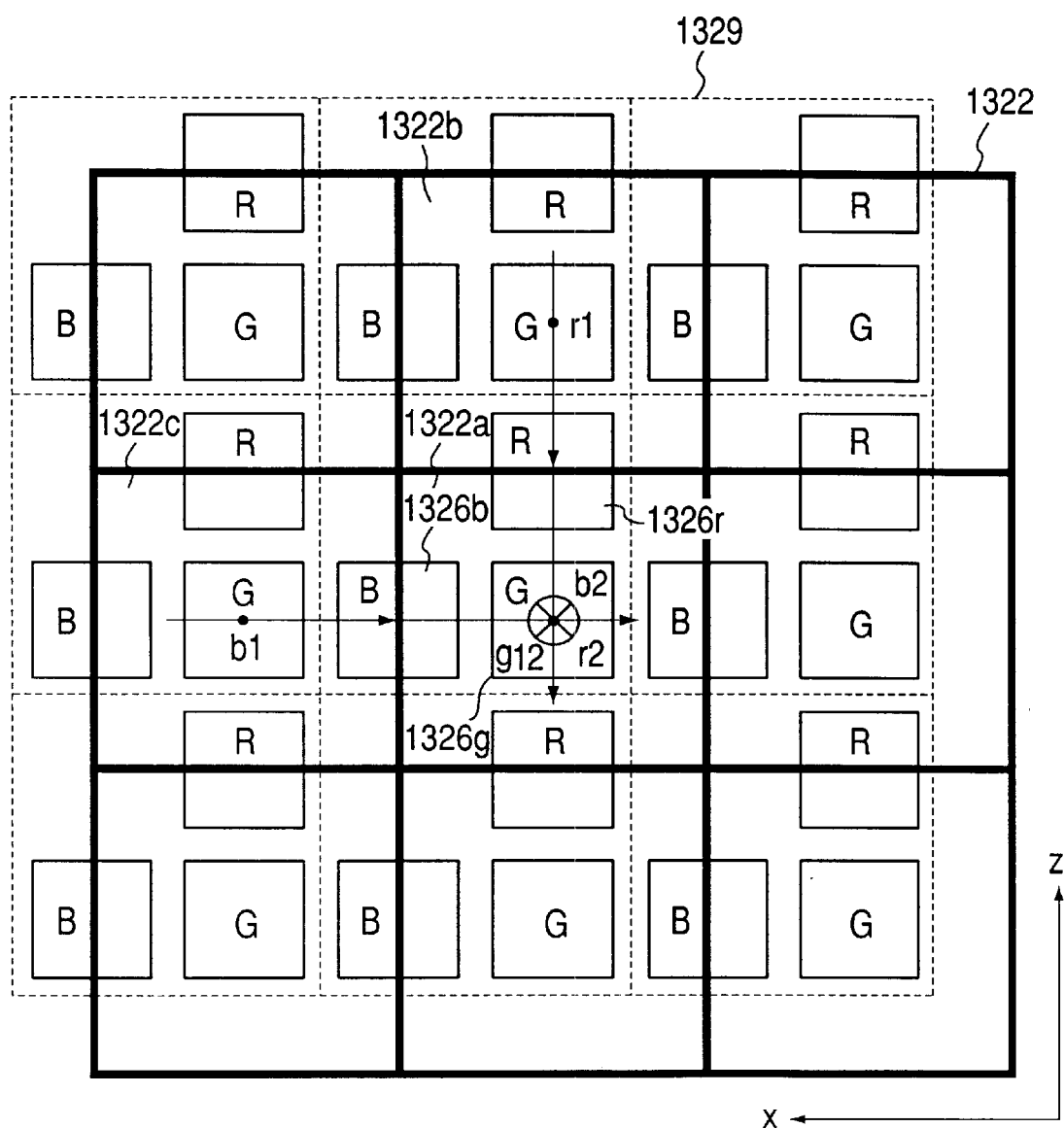
FIG. 6 is a partly enlarged, top plan view of the liquid crystal panel in the first embodiment according to the present invention.

FIG. 6 is a partly enlarged, top plan view of the present liquid crystal panel. In the figure each square 1329 indicated by the dashed lines represents an assembly of R, G, and B pixels composing one picture element. This means that when the R, G, and B pixels are driven by the active matrix driving circuit section 1327 of FIG. 4, each RGB pixel unit indicated by a dashed-line square 1329 is driven by R, G, B video signals corresponding to a common pixel position.

Let us focus here attention on one picture element composed of the R pixel electrode 1326r, the G pixel electrode 1326g, and the B pixel electrode 1326b. First, the R pixel electrode 1326r is illuminated by the R light obliquely incident from the microlens 1322b as indicated by arrow r1 and as described previously. The R reflected light thereof is emergent through the microlens 1322a as indicated by arrow r2. The B pixel electrode 1326b is illuminated by the B light obliquely incident from the microlens 1322c as indicated by arrow b1 and as described previously. The B reflected light thereof is also emergent through the microlens 1322a as indicated by arrow b2. The G pixel electrode 1326g is illuminated by the G light incident normally (in the direction going into the plane of the drawing) from the microlens 1322a as indicated by the ingoing/outgoing arrow g12 and as described previously. The G reflected light thereof is also emergent normally (in the direction outgoing from the plane of the drawing) through the same microlens 1322a.

As described, in the present liquid crystal panel, the incident illumination positions of the respective primary color illumination beams are different from each other in each RGB pixel unit composing one picture element, but the beams emerging therefrom pass through the same microlens (1322a in this case). This also holds for the all other picture elements (the R, G, B pixel units).

Figure 7:
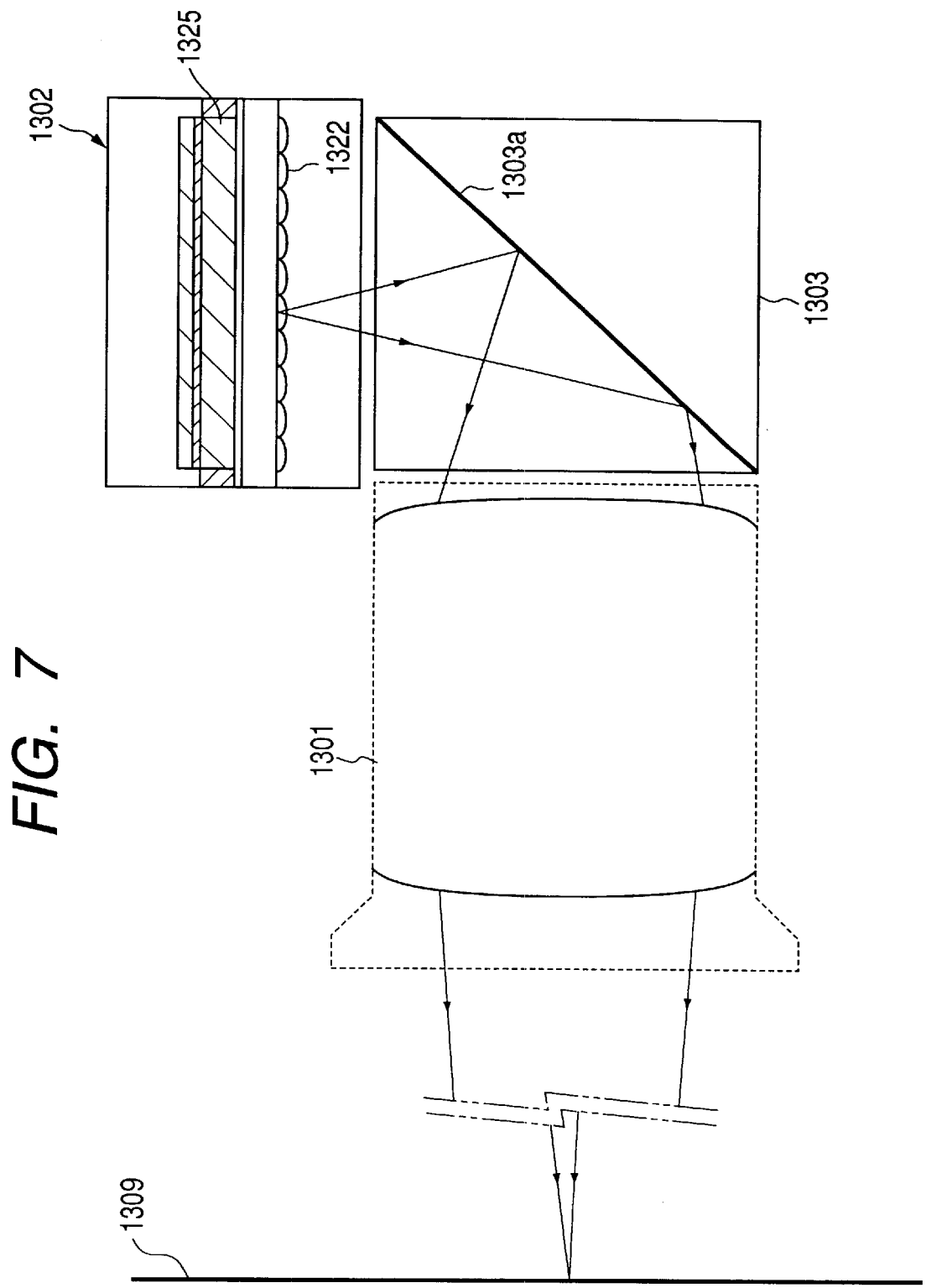
FIG. 7 is a partial structural diagram to show a projection optical system of the projection type liquid crystal display device according to the present invention.
Figure 9:
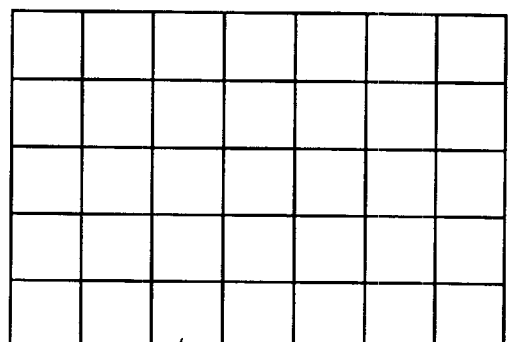
FIG. 9 is a partly enlarged view of a projected image on the screen in the projection type liquid crystal display device according to the present invention.

When the whole emerging light from the present liquid crystal panel is projected through the PBS 1303 and projection lens 1301 onto the screen 1309 and when optical adjustment is achieved so that the positions of the microlenses 1322 in the liquid crystal panel 1302 are imaged and projected onto the screen 1309 as illustrated in FIG. 7, the projected image is composed of component units of picture elements each in a mixed color state of emerging beams from the R, G, B pixel unit composing each picture element, i.e., in a state of mixture of colors in the respective pixels in the grid pattern of the microlenses as illustrated in FIG. 9, accordingly. Thus, good color image display with high quality can be achieved without the so-called RGB mosaic pattern as in the conventional case of FIG. 14 described previously.

Figure 20:
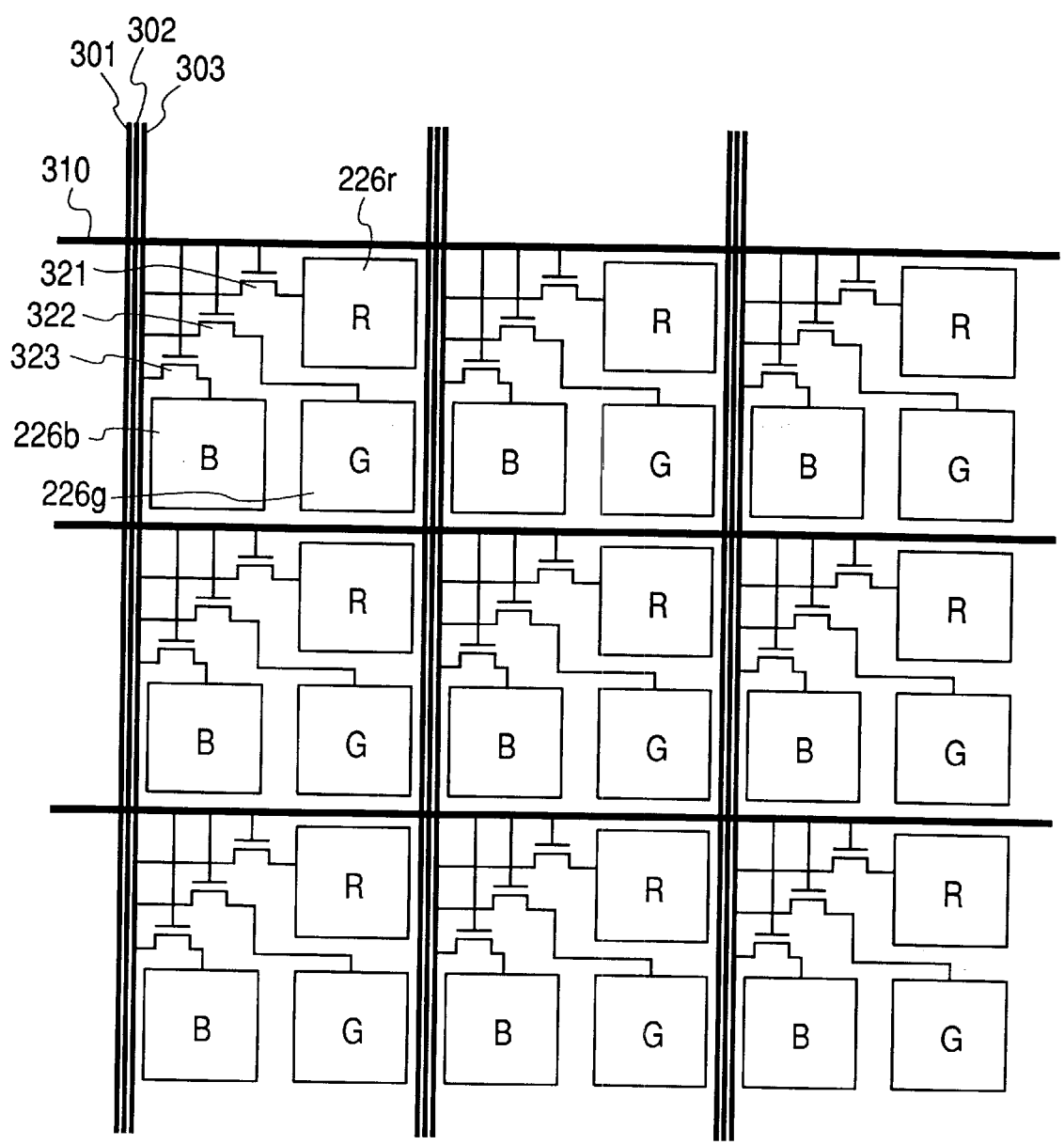
FIG. 20 is a block diagram of driving circuitry around the liquid crystal panel to show the fourth embodiment of the present invention.

Next, as shown in FIG. 4, the active matrix driving circuit section 1327 exists underneath the pixel electrodes 1326. The R, G, and B pixels composing a picture element are depicted simply in horizontal arrangement on the circuit sectional diagram of FIG. 4, but the drains of the respective pixel FETs are connected to corresponding R, G, B pixel electrodes 226 of the two-dimensional array as illustrated in FIG. 20.

Figure 8:
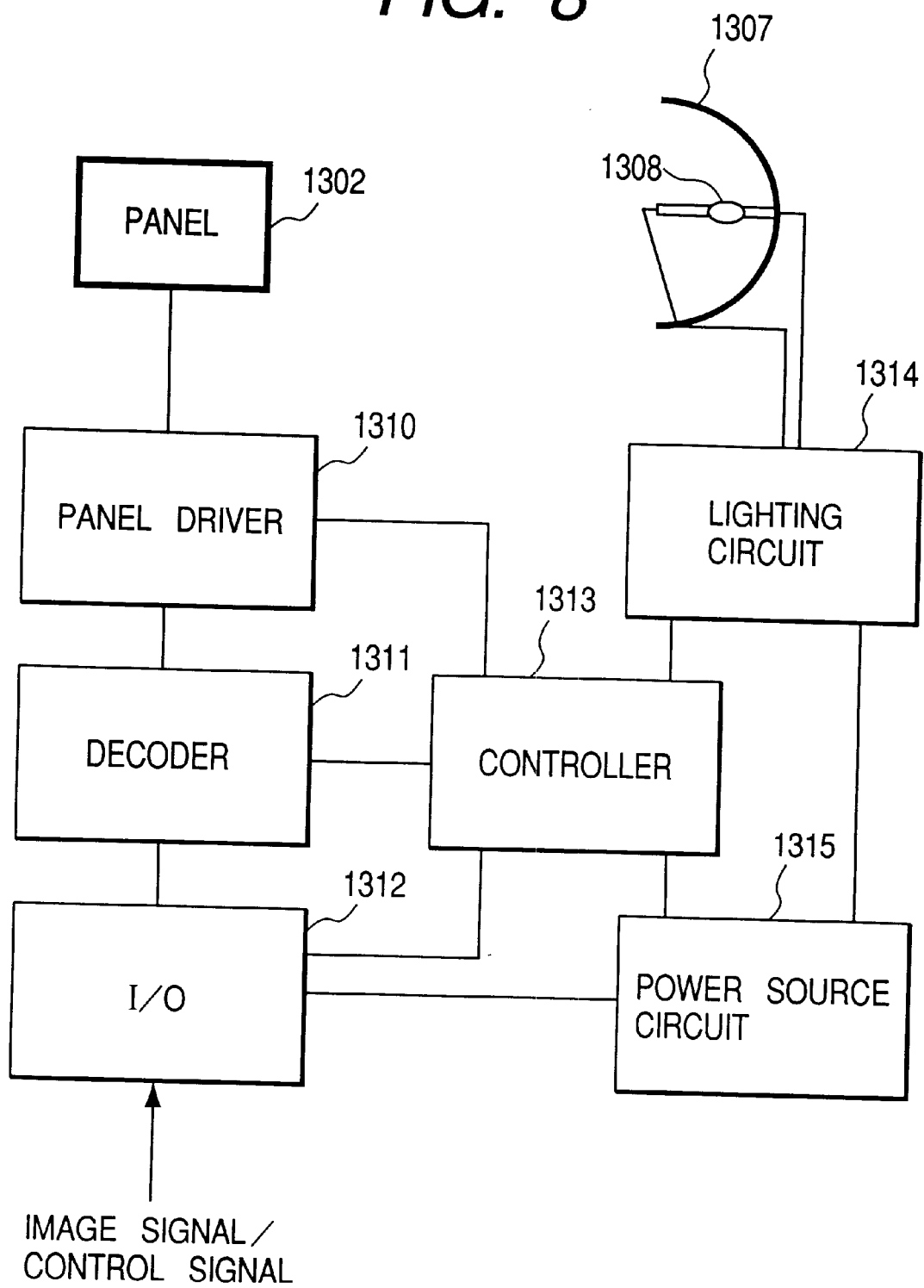
FIG. 8 is a block diagram to show a driving circuit system of the projection type liquid crystal display device according to the present invention.

Incidentally, the overall block diagram of the driving circuit system of the present projection type liquid crystal display device is illustrated in FIG. 8. Numeral 1310 represents a panel driver, which inverts the polarities of R, G, B video signals, which forms liquid crystal driving signals amplified by predetermined voltage amplification, and which forms driving signals of the opposite electrode 1324, various timing signals, and so on. Numeral 1312 is an interface, which decodes various video and control transmission signals to standard video signals and the like.

Numeral 1311 stands for a decoder, which decodes and converts the standard video signals from the interface 1312 to R, G, B primary color video signals and synchronous signals, i.e., to the image signals corresponding to the liquid crystal panel 1302. Numeral 1314 indicates a lighting circuit being a ballast, which activates an arc lamp 1308 in an ellipsoidal reflector 1307. Numeral 1315 is a power supply circuit, which supplies power to each circuit block. Numeral 1313 designates a controller including a control section not illustrated, which totally controls each of the above circuit blocks. As described, the present projection type liquid crystal display device has the driving circuit system which is a very popular one for the single-panel projector, and it can display a color image with good quality but without the RGB mosaic as stated previously, particularly without imposing loads on the driving circuit system.

Figure 10:
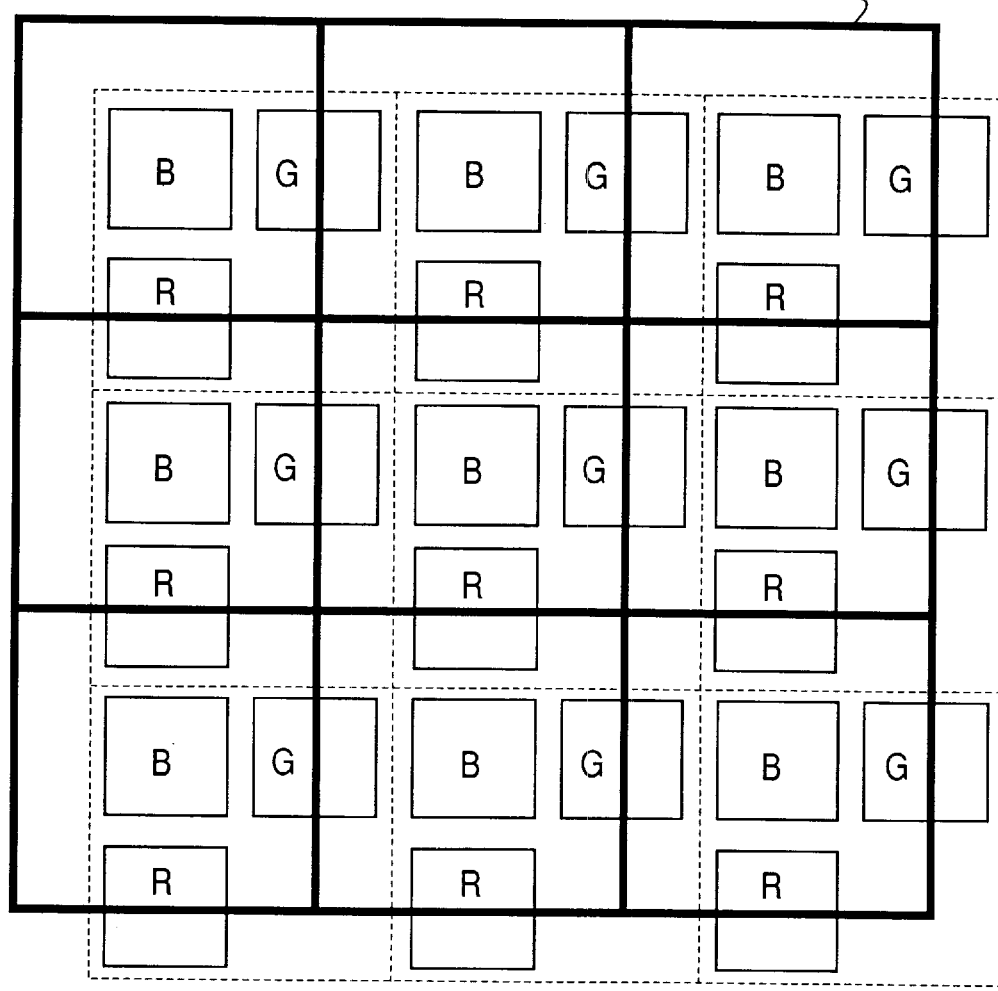
FIG. 10 is a partly enlarged, top plan view of another form of the liquid crystal panel of the first embodiment according to the present invention.

FIG. 10 is a partly enlarged, top plan view of another form of the liquid crystal panel in the present embodiment. In this example the B pixel electrodes are arrayed at the positions immediately below the centers of microlenses 1322, the G pixels 1326g are arrayed alternately and horizontally with respect to the B pixels 1326b, and the R pixels 1326r are arrayed alternately and vertically with respect to the B pixels 1326b. This array can also achieve the same effect as the previous example, by employing such a configuration that the B light is incident normally and the R, G light is incident obliquely (at the same angle but in different directions) so as to emit the reflected light from the R, G, B pixel unit composing a picture element, through one common microlens. Still another example is such that the R pixels are arrayed at the positions immediately below the centers of the microlenses 1322 and the other color pixels, the G and B pixels, are arrayed alternately with respect to the R pixels horizontally or vertically.

Next described in detail are the pixel electrodes 1326 and the active matrix driving circuit section 1327 for actively driving them, provided on the silicon semiconductor substrate 1328.

Embodiment 2

Figure 11:
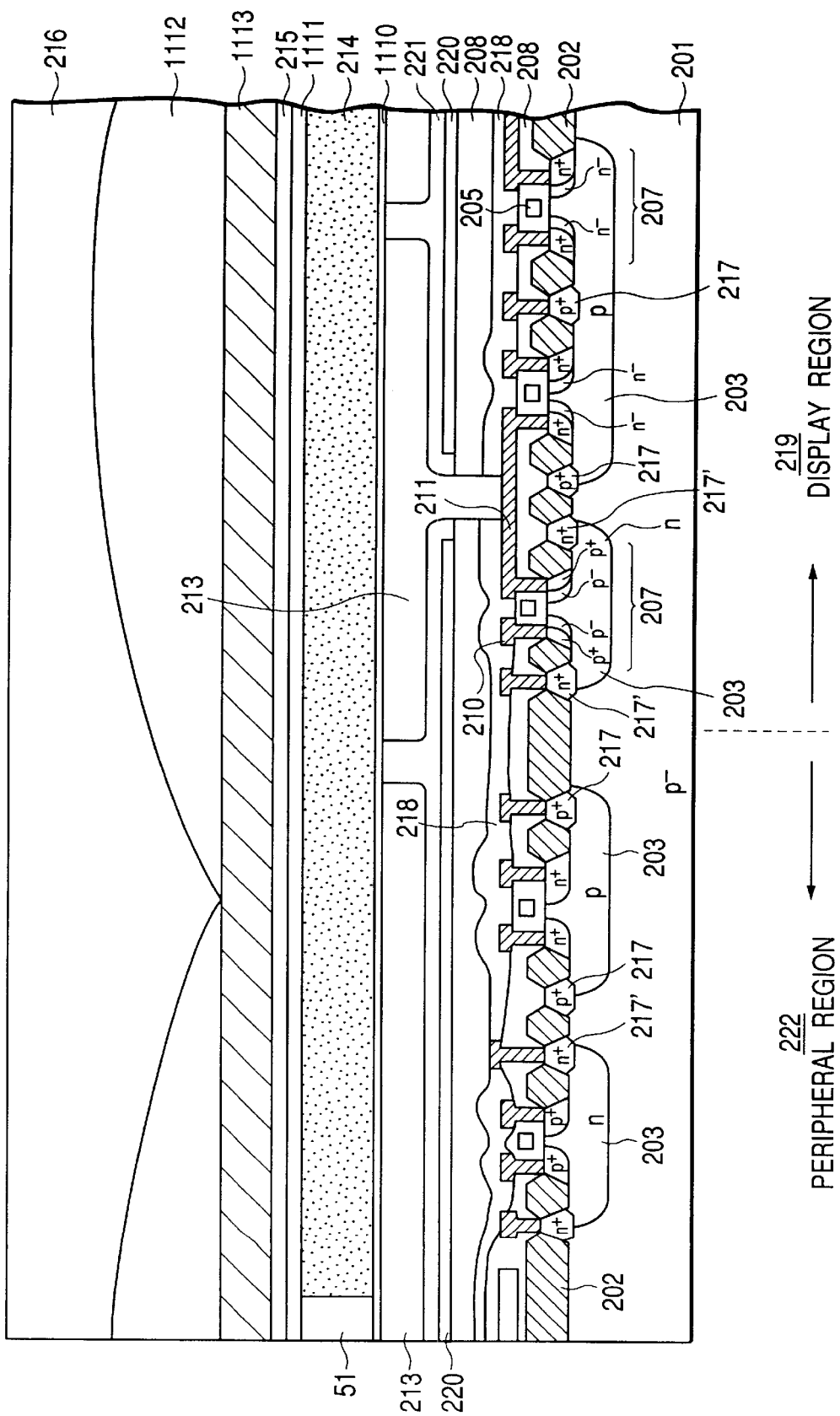
FIG. 11 is a sectional view of the liquid crystal panel to show the first embodiment of the present invention.

The second embodiment of the present invention will be described in detail by reference to the drawings. FIG. 11 is an explanatory drawing to explain the base substrate used in the present invention. This substrate 201 is made of a p-type semiconductor and the substrate is at the lowest potential (normally, the ground potential) during operation. The voltages applied to the pixels are placed on the n-type wells in the display region. On the other hand, the logic driving voltage is applied to the logic parts of the peripheral circuits. This structure permits the optimum devices to be constructed according to the respective voltages and can implement not only reduction of the chip size, but also high-pixel-density display based on increase of driving speed.

In FIG. 11, reference numeral 201 designates a semiconductor substrate, 202 a field oxide film such as LOCOS, 203 p-type and n-type wells, 205 gate regions, 207 drain or source regions, 210 source electrodes connected to the respective data wires, 218 drain electrodes connected to the respective pixel electrodes, and 213 the pixel electrodes which also serve as reflective electrodes.

Numeral 220 represents a shielding layer covering the display region and peripheral region, for which Ti, TiN, W, Mo, or the like is suitable. As seen from FIG. 11, the shielding layer 220 covers the display area except for the connecting portions between the pixel electrode 213 and source electrode 210. The shielding layer is so designed in the peripheral pixel region that the shielding layer 220 is removed from regions where the wiring capacitance is large, such as some video lines, clock lines, etc. While, at a section where the incidence of the illumination light in the portions without the shielding layer 220 causing an erroneous operation, the pixel electrode layer is covered, thereby attempting to achieve a measure capable of transferring signals at high speed.

Further, numeral 208 denotes an insulating layer below the shielding layer 220, and stability of the insulating layer 208 is assured by carrying out a flattening process by SOG on a P-SiO layer and further covering the layer by a P-SiO layer. It is needless to mention that, in addition to the flattening by SOG, the insulating layer can be formed by a method for forming a P-TEOS film, covering it by P-SiO, and thereafter flattening the insulating layer by the CMP process.

Numeral 221 indicates an insulating layer provided between the reflective electrodes 213 and the shielding layer 220, and a charge storage capacitor of each reflective electrode is created through this insulating layer. For creating a large capacitor, it is effective to employ a multilayer film or the like with P-SiN, $Ta_2O_5$, or $SiO_2$ of high permittivity, in addition to $SiO_2$. A preferred thickness range is approximately 500 to 50000 Å by providing the insulating layer on the flat metal of Ti, TiN, Mo, or W or the like as the shielding layer.

Numeral 214 represents a liquid crystal material of the DAP mode, 1110, 1111 vertical alignment layers, 215 a common transparent electrode, 216 a common electrode substrate (opposite substrate), 217 high-concentration impurity regions, 219 the display region, 222 the peripheral region, and 1112 the microlenses. Numeral 1113 represents a glass sheet.

In FIG. 11, each high-concentration impurity region 217 of the same polarity as the associated well 203 formed below the transistor is made around and inside the well 203, and the well potential is fixed to the desired potential by the low-resistance layer. A method for producing the liquid crystal panel will be described referring to FIGS. 21A to 21E and FIGS. 22F to 22H. FIGS. 21A to 21B and FIGS. 22F to 22H show production steps of the active matrix substrate and sectional views of the liquid crystal devices. The present embodiment will be described in detail step by step. FIGS. 21A to 21E and FIGS. 22F to 22H show the pixel section and, at the same time as the steps of forming the pixel section, the peripheral driving circuits such as the shift registers for driving the switching transistors in the pixel section can also be made on the same substrate.

Figure 21A:
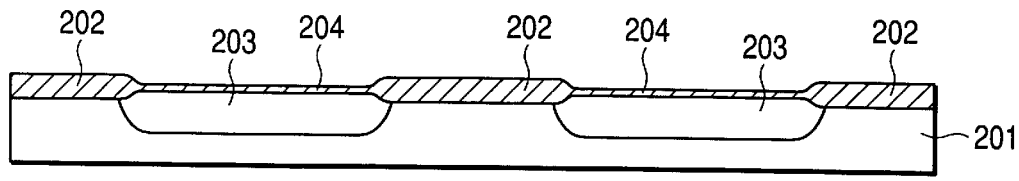
FIG. 21A, FIG. 21B, FIG. 21C, FIG. 21D, and FIG. 21E are sectional views to show production steps of the liquid crystal display device.

The p-type silicon semiconductor substrate 201 with the impurity concentration of not more than $10^{15}$ cm$^{-3}$ is locally thermally oxidized to form LOCOS 202 and, with the LOCOS 202 as a mask, ions of boron are implanted in the dose of about $10^{12}$ cm$^{-2}$ to form PWL 203 which represents n-type impurity regions with the impurity concentration of $10^{16}$ cm$^{-3}$ to $10^{17}$ cm$^{-3}$. Likewise, NWL regions are formed by ion implantation of phosphorus (though not illustrated). This substrate 201 is again thermally oxidized to form gate oxide film 204 having the thickness of oxide film of not more than 1000 Å (FIG. 21A).

Figure 21B:
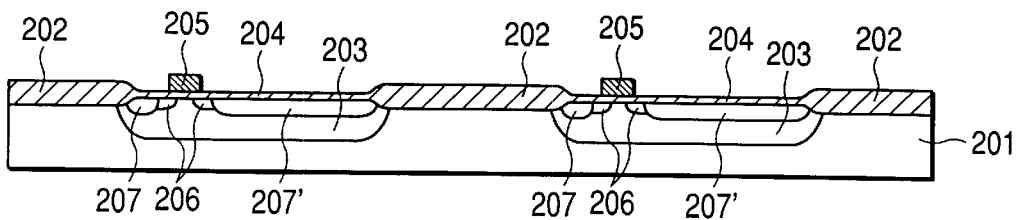

Further, gate electrodes 205 made of n-type polysilicon doped with phosphorus of about $10^{20}$ cm$^{-3}$ are formed and thereafter ions of phosphorus or boron are implanted in the dose of about $10^{12}$ cm$^{-2}$ into the substrate 201 to form NLD 206 (or PLD) which represents n-type impurity or p-type impurity regions having the impurity concentration of about $10^{16}$ cm$^{-3}$. Subsequently, using a patterned photoresist as a mask, ions of phosphorus or boron are implanted in the dose of about $10^{15}$ cm$^{-2}$ to form source and drain regions 207, 207' having the impurity concentration of about $10^{19}$ cm$^{-3}$ (FIG. 21B).

Figure 21C:
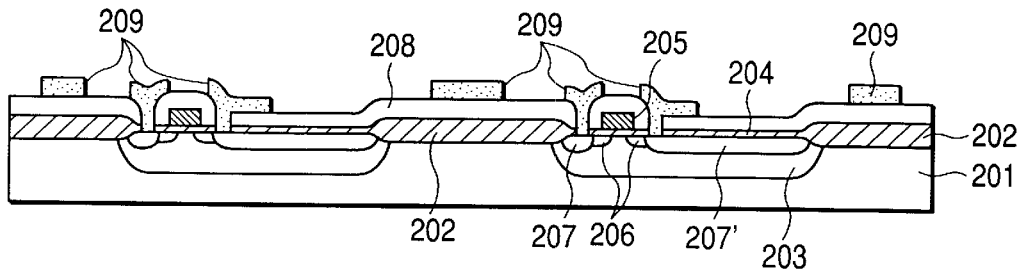

PSG 208, which is an interlayer film, is formed over the entire surface of substrate 201. This PSG 208 can be replaced by NSG (Nondoped Silicate Glass)/BPSG (Boro-Phospho-Silicate Glass) or TEOS (Tetraethoxy-Silane). The PSG 208 is patterned to form contact holes immediately above the source and drain regions 207, 207', Al is evaporated by sputtering, and thereafter the Al layer is patterned to form Al electrodes 209 (FIG. 21C). In order to improve ohmic contact characteristics of the Al electrodes 209 with the source and drain regions 207, 207', a barrier metal such as Ti/TiN is desirably placed between the Al electrodes 209 and the source/drain regions 207, 207'.

Figure 21D:
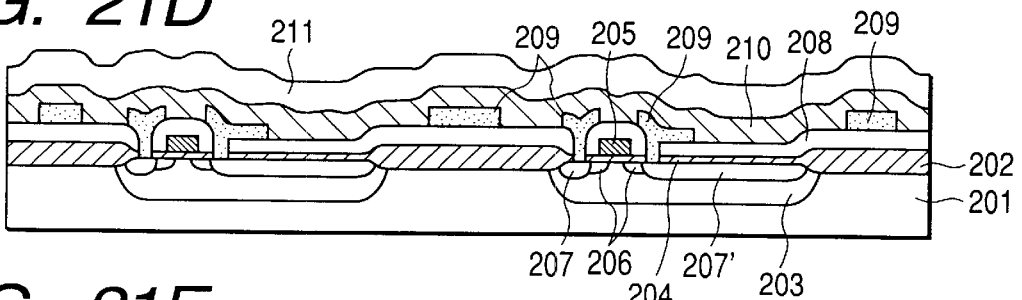

Plasma SiN 210 is deposited in the thickness of about 3000 Å over the entire surface of substrate 201 and then PSG 211 is deposited in the thickness of about 10000 Å thereon (FIG. 21D).

Figure 21E:
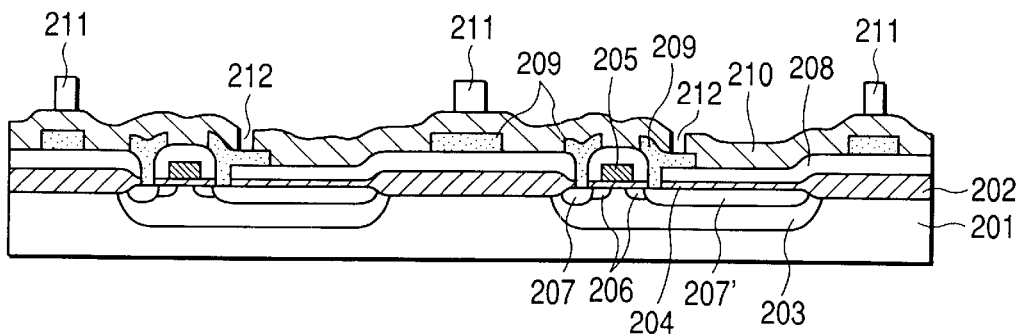

Using the plasma SiN 210 as a dry etching stopper layer, the PSG 211 is patterned so as to leave only separating regions between pixels and thereafter the plasma SiN 210 is patterned by dry etching to form through holes 212 immediately above the Al electrodes 209 in contact with the drain regions 207' (FIG. 21E).

Figure 22F:
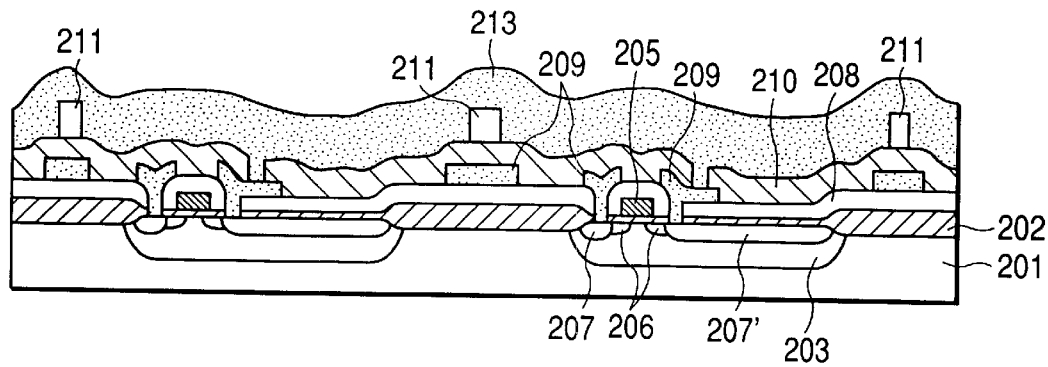
FIG. 22F, FIG. 22G, and FIG. 22H are sectional views to show production steps of the liquid crystal display device.

Then a pixel electrode layer 213 is deposited in the thickness of not less than 10000 Å on the substrate 201 by sputtering or EB (Electron Beam) evaporation (FIG. 22F). This pixel electrode layer 213 is a metal film of Al, Ti, Ta, W, or the like, or a compound film of either one of compounds of these metals.

A method for forming the pixel electrodes will be detailed below. The pixel electrodes 213 are made by first forming a TiN film over the entire surface of the substrate 201 by sputtering. On the film a metal film of Al, Al—Si, Al—Cu, Al—Si—Cu, Ti, Ta, W, or Mo or the like is further formed at high temperature of 400 to 500° C. There are no specific restrictions on the materials, but it is preferred to select materials with high reflectance and with a good filling property. Thereafter, the substrate is subjected to a thermal treatment to heat up to 400 to 500° C. and to bring about reflow of the layer, whereby fluidity is further enhanced so as to form the layer while filling the holes 212 connecting the pixel electrodes to the base electrodes. An appropriate thickness of the TiN film is approximately 2000 to 3000 Å.

Figure 22G:
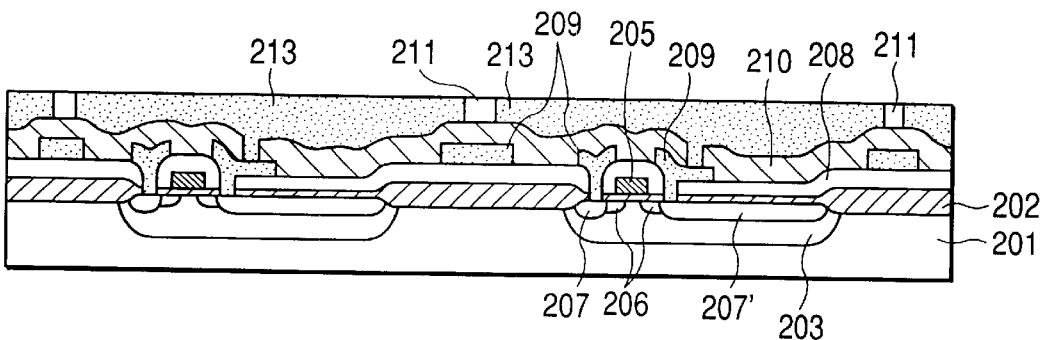
Figure 22H:
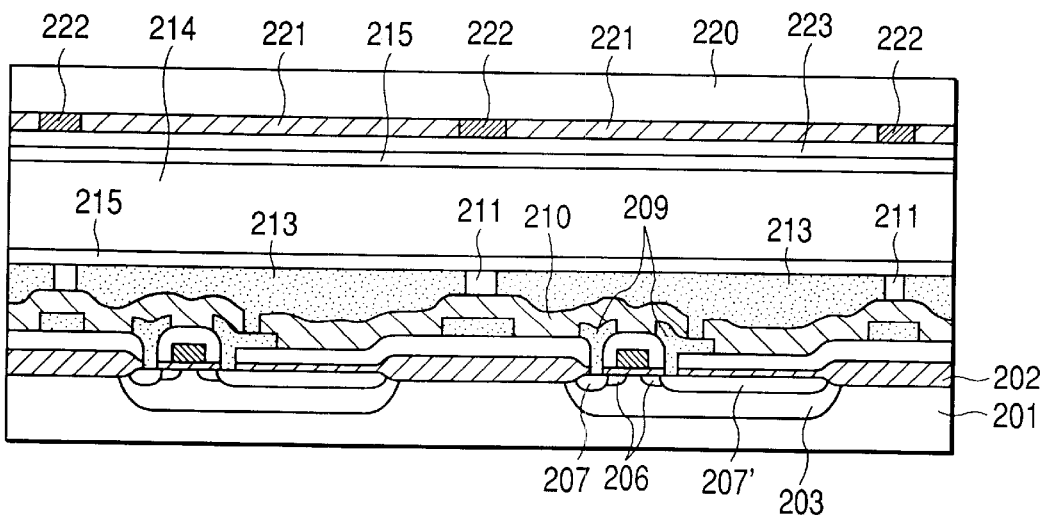

Then the surface of the pixel electrode layer 213 is polished by CMP (FIG. 22G). When the thickness of PSG 211 is 10000 Å and the thickness of the pixel electrode layer is x Å, polishing amounts are not less than x Å but less than x+10000 Å.

Specifically, the polishing was conducted using CMP apparatus EPO-114 available from Ebara Seisakusho, polishing cloth SUPREME RN-H (D51) available from Rodel Inc., and slurry PLNERLITE5102 available from FUJIMI Co.

Figure 12:
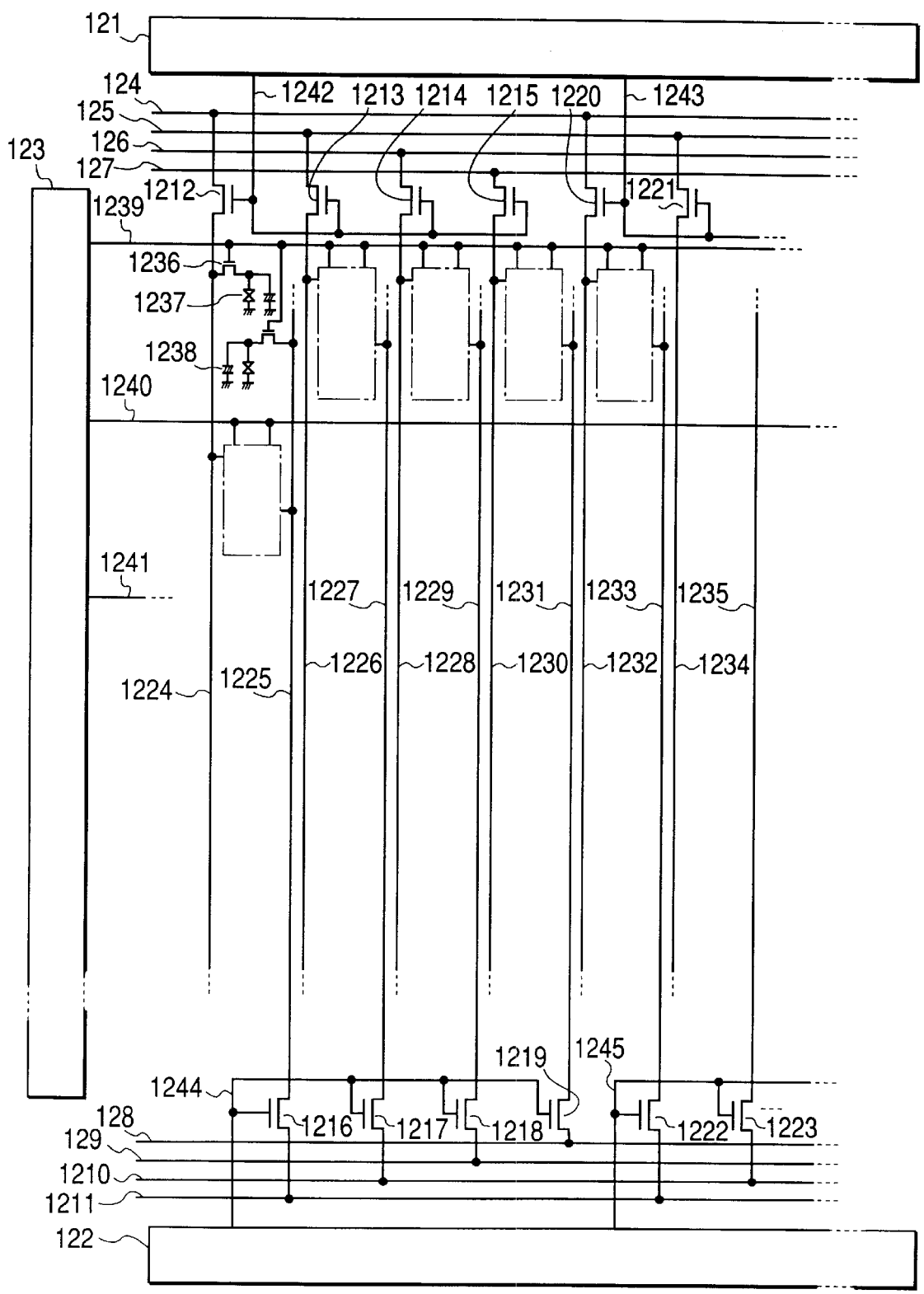
FIG. 12 is a block diagram of peripheral driving circuitry around the liquid crystal panel to show the first embodiment of the present invention.

Next described is a method for driving the liquid crystal panel used in the liquid crystal projector apparatus according to the present embodiment. In FIG. 12, numerals 121, 122 denote horizontal shift registers, 123 a vertical shift register, 124 to 129, 1210, 1211 video lines for video signals, 1212 to 1223 sampling MOS transistors for sampling the video signals according to scanning pulses from the horizontal shift register, 1224 to 1235 signal lines through which the video signals are supplied, 1236 a switching MOS transistor of each pixel section, 1237 the liquid crystal interposed between the pixel electrode and the common electrode, and 1238 an additional capacitor attendant on each pixel electrode. Numerals 1239, 1240, 1241 represent driving lines for horizontal scanning outputs from the vertical shift register 123, and 1242 to 1245 output lines for vertical scanning from the horizontal shift registers 121, 122.

In this circuit, the video signals input thereto are sampled by the vertical scanning control signals 1242 to 1245 of the horizontal shift registers through the sampling MOS transistors 1212 to 1223. Supposing at this time the horizontal scanning control signal 1239 of the vertical shift register is in an output state, the switching MOS transistor 1236 of the pixel section becomes on, whereby a potential of the sampled signal line is written into the pixel.

The surface of the base substrate thus formed was flat throughout the entire surface of substrate and the unevenness thereof was the peak-to-valley of 500 Å or less in the regional portion where one microlens illustrated in the plan view of FIG. 6 was formed. Then a polyimide vertical alignment film (SE1211 available from Nissan Kagaku Kogyo) was diluted with nBC (normal butyl cellosolve) and printed on the base substrate by the printing method. Preheating was conducted at 80° C. for one minute and polyimide formation was conducted at the temperature of 180° C. for one hour. Then rubbing was conducted with rayon rubbing cloth the diameter of which was 20 μm. The surface energy obtained from an angle of contact at this time was 35 dyn/cm. After the rubbing, the surface of the vertical alignment layer was uniform even in the pixel border portions and the through hole portions and no peeling-off was observed.

On the other hand, a transparent electrode layer of ITO was formed on the opposite substrate on which the microlens array was formed, and thereafter the same vertical alignment film was printed by the printing method. Then the rubbing was conducted in the antiparallel direction to that of the base substrate. Then the substrates were bonded to each other, the liquid crystal demonstrating the negative dielectric anisotropy (MLC-6609 available from Merck Japan Ltd.)

was injected into between them, and they were sealed to form the liquid crystal display panel used in the reflective display device. This panel was evaluated by checking the vertical alignment with a polarizing microscope and measuring the pretilt angles and contrast. In the present embodiment, the pretilt angles were 4°, the contrast was 300, and non uniformity was not observed in the pixel section. Therefore, the present embodiment realized the liquid crystal display device of high-quality image.

On the other hand, comparative samples were prepared as samples having surface steps of 200 Å to 1 µm in the microlens region, in which the polyimide vertical alignment layers were printed and the rubbing was carried out in the same manner as described above. The rubbing conditions were those to achieve the highest value of contrast and the rate of rotation of the roller was constant at 1000 rpm.

Figure 15:
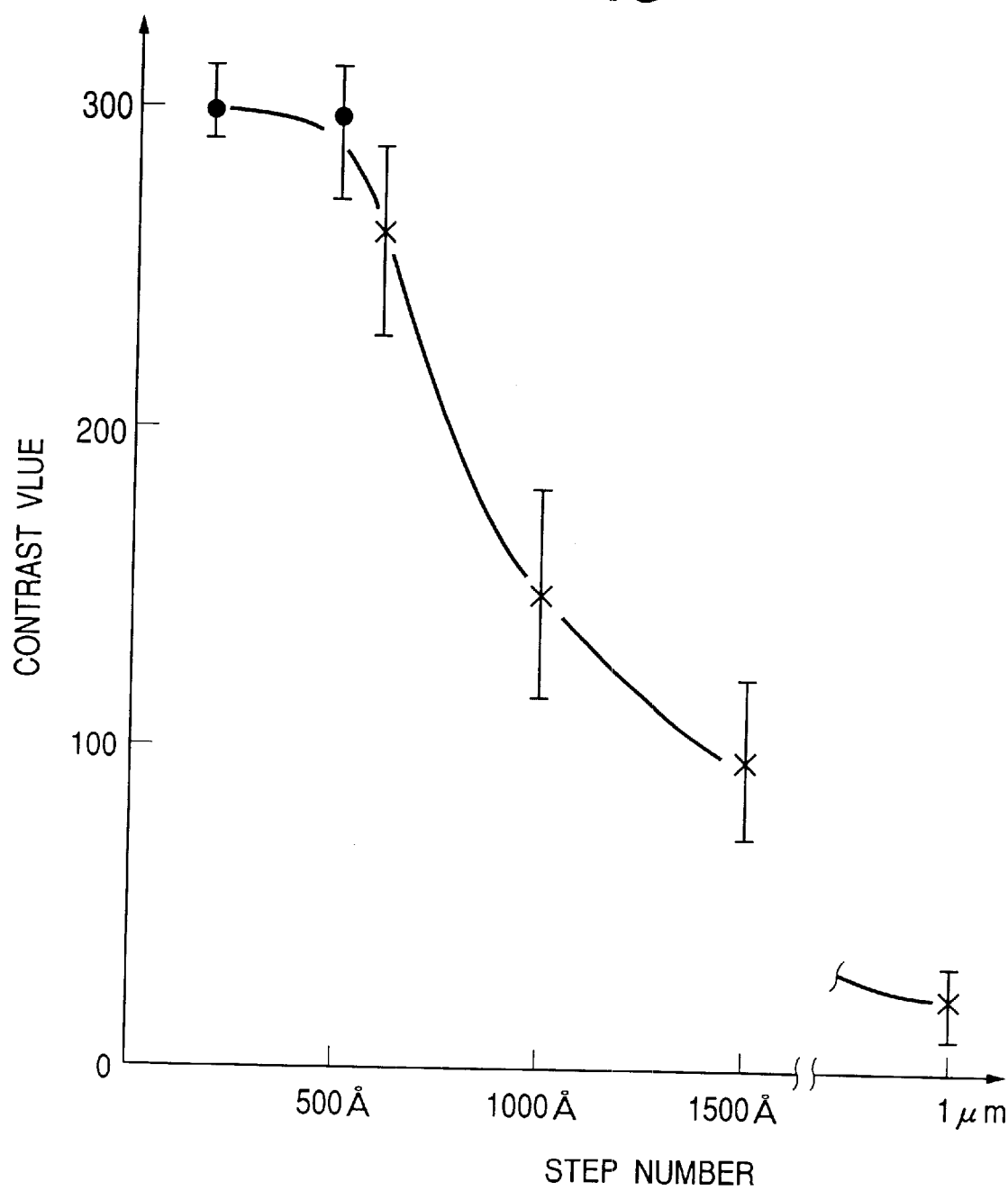
FIG. 15 is a drawing to show the relationship between step and contrast in the first embodiment of the present invention.

In FIG. 15 the abscissa represents the steps and the ordinate the contrast. In FIG. 15 marks x indicate samples suffering peeling-off of the vertical alignment film after the rubbing. It is seen that where the steps are over 500 Å, peeling-off of the vertical alignment film is observed after the rubbing and the contrast values also decrease therewith. It is thus understood that the steps need to be not more than 500 Å.

Embodiment 3

Figure 16:
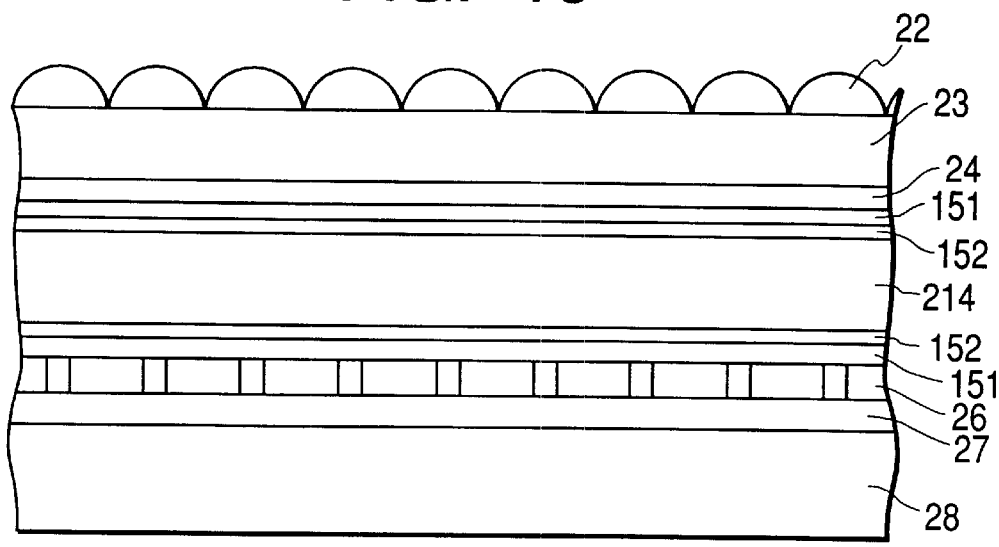
FIG. 16 is a sectional view of a liquid crystal panel to show the second embodiment of the present invention.

Embodiment 3 of the present invention will be described below. FIG. 16 is a diagram to show the third embodiment. In FIG. 16, numeral 28 represents a semiconductor substrate, 27 an active matrix substrate electrode formed on the semiconductor substrate, 26 pixel electrodes corresponding to the respective colors, 214 the liquid crystal, 24 an opposite transparent electrode of ITO or the like, 23 a glass sheet on which the microlenses are formed, and 22 the microlenses. The microlenses 22 are formed one each for three pixel electrodes 26.

Referring to FIG. 16, the base substrate is the same as in Embodiment 1, but the vertical alignment layer is of double-layered structure. A first alignment film 151 was a horizontal alignment film, which was formed as a horizontal alignment film of polyimide having the surface energy of 52 dyn/cm in the thickness of 300 Å by the spin method. A second vertical alignment film 152 of polyimide having smaller surface energy than that of the polyimide horizontal alignment film 151 of the first layer was formed thereon in the thickness of about 500 Å and thereafter the surface of the second polyimide vertical alignment film 152 was rubbed by the rubbing method. The rubbing cloth used herein was rayon cloth having the diameter of 20 µm. The important point herein is that the polyimide horizontal alignment film 151 of the first layer is the horizontal alignment film with high wettability and good adhesion and that the polyimide vertical alignment film 152 of the second layer to be in contact with the liquid crystal or to determine the alignment state of the liquid crystal is the vertical alignment film with the smaller surface energy and with the strong, vertical alignment property. This structure permits the vertical alignment layer with high reliability to be formed while stably controlling the vertical alignment property.

On the other hand, after formation of the ITO transparent electrode 24 on the opposite substrate 23 mounted with the microlens array 22, the vertical alignment film 152 and horizontal alignment film 151 were also formed in the same process as described above and the rubbing was conducted in the antiparallel direction. Then the substrates were bonded to each other, the liquid crystal demonstrating the negative dielectric anisotropy (MLC-6609 available from Merck Japan Ltd.) was injected into between the substrates, and they were sealed to form the liquid crystal display panel used in the reflective liquid crystal display device. The resultant panel had the pretilt angles of 4° and the contrast of 300, thus demonstrating good characteristics.

Embodiment 4

Figure 17:
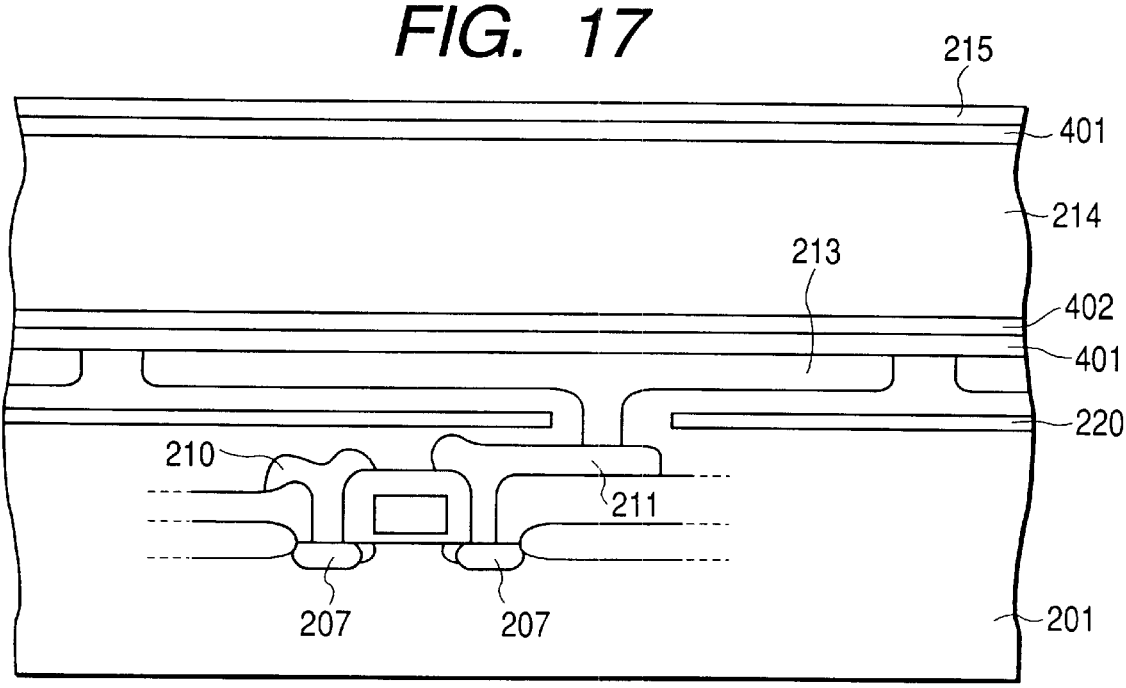
FIG. 17 is a sectional view of a liquid crystal panel to show the third embodiment of the present invention.

Embodiment 4 of the present invention will be described. FIG. 17 is a diagram to show the fourth embodiment. In FIG. 17, reference numeral 201 designates a semiconductor substrate, 207 source regions or drain regions of high-concentration regions formed in the well regions, 220 a shielding layer, 213 the reflective electrodes, and 214 the liquid crystal layer.

Referring to FIG. 17, the base substrate is the same as in Embodiment 1, but the vertical alignment layer is of the double-layered structure. The first vertical alignment film 401 was a vertical alignment film of polyimide having the surface energy of 36 dyn/cm (available from Dow Corning Toray Silicone Co., Ltd.), which was formed in the thickness of 300 Å by the spin method. Then the second vertical alignment film 402 of polyimide having the smaller surface energy than that of the polyimide vertical alignment film of the first layer was formed in the thickness of about 200 Å thereon and thereafter the surface of the second polyimide vertical alignment film 402 was rubbed by the rubbing method. The rubbing cloth used herein was the rayon cloth having the diameter of 20 µm. The important point herein is that the first layer is the vertical alignment film 401 with high wettability and good adhesion and that the second layer to determine the alignment state of the liquid crystal is the vertical alignment film 402 with the smaller surface energy and with the strong vertical alignment property. This structure permits the vertical alignment layer with high reliability to be formed while stably controlling the vertical alignment property.

Another effect is capability of increasing the strength of rubbing. With increasing indentation amounts of rubbing and rotations of the roller, the polyimide vertical alignment film of the second layer is peeled off in part, mainly, in step portions. Particularly, existence of particles (fine grains) increases the frequency of peeling-off, but this does not result in complete loss of the vertical alignment layer. There still exists the vertical alignment film of the first layer. Since the surface energy of this part is a little higher than that of the second layer, the performance to control alignment becomes somewhat weaker than that of the other portions. It was found, however, that disorder of alignment was not so great because of the interaction not only at the interface but also in the peripheral part.

On the other hand, the transparent electrode layer of ITO was formed on the opposite substrate on which the microlens array was formed, and thereafter the same vertical alignment layer was printed by the printing method. Then the rubbing was conducted in the antiparallel direction to that of the base substrate. Then the substrates were bonded to each other, the liquid crystal demonstrating the negative dielectric anisotropy (MLC-6609 available from Merck Japan Ltd.) was injected into between the substrates, and they were sealed to form the liquid crystal display panel used in the reflective display device.

The panel was evaluated as to the contrast in the same manner as in Embodiment 1. Decrease of contrast value was not observed even if the rubbing was conducted under the force resulting in the indentation amounts of rubbing and rotations of the roller 30% and over higher than before.

The present embodiment showed the example of the polyimide vertical alignment films of the different types as the vertical alignment films of the first layer and the second layer, but the present invention also involves the following alignment layer. This is an example in which the structures of the alignment films of the first layer and the second layer are equal in the final form, but their forming methods are different.

The vertical alignment film of the first layer will be described first. The polyimide-based vertical alignment film was SE1211 available from Nissan Kagaku Kogyo. This SE1211 was mixed at the ratio of 1:2 with nBC, and a film with improved wettability was formed on the base reflective electrodes. Further, the second layer was formed using a mixture in which the polyimide vertical alignment film of SE1211 was mixed at the ratio of 2:1 with nBC. At this time, the second film was obtained with different wettability and with smaller, stable surface energy.

We have described above heretofore the examples in which the same structure was applied to the both vertical alignment layers on the base substrate and on the opposite substrate, but it is needless to mention that there are no specific restrictions on the structure. The effect is still high even in the structure in which only the vertical alignment layer on either one side is the vertical alignment layer of the multiple films as illustrated in FIG. 17.

Embodiment 5

Figure 18:
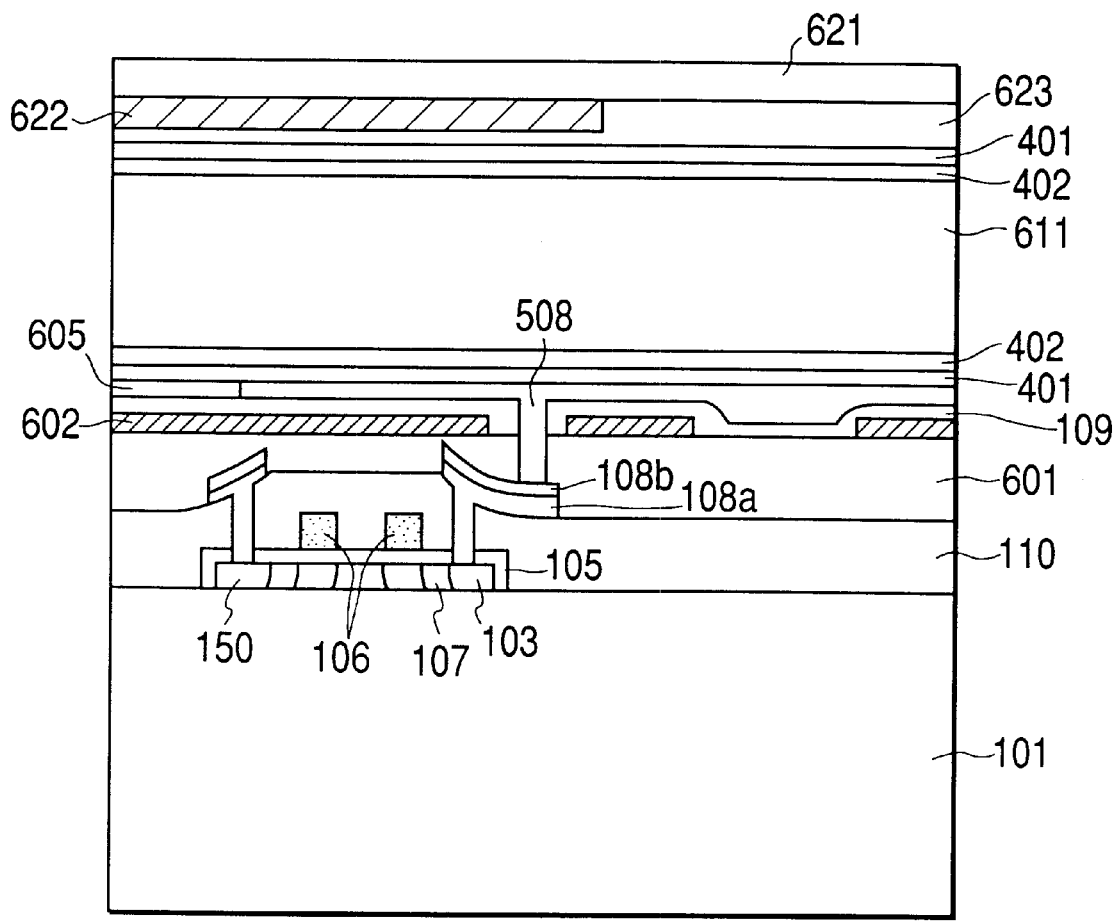
FIG. 18 is a sectional view of a base substrate to show the fourth embodiment of the present invention.

The fifth embodiment of the present invention will be described referring to FIG. 18. The present embodiment will be described as to a process in application to low-temperature Poly-SiTFT.

First, a glass substrate 101 was buffer-oxidized and then a layer of a-Si was deposited in the thickness of about 50 nm at 425° C. and from $Si_2H_6$ gas by ordinary LPCVD. After that, the layer was polycrystallized by KrF excimer laser. Then an oxide film 105 10 to 100 nm thick was formed as a gate oxide film. After formation of gate electrodes 106, the sources and drains were formed by the ion doping method. Activation of impurities was conducted at 300° C. to 400° C. in a nitrogen ambience for one to three hours, and after formation of an insulating film of 500 nm, it was patterned to form contact holes. Then a wire layer 108 was formed. For example, the present embodiment employs TiN as barrier metal and Al wires doped with 0.5 to 2% silicon. The electrode materials for the pixel electrodes 108a, 108b may be selected from materials used in the ordinary semiconductors and in the TFT processes, including other Al alloys, W, Ta, Ti, Cu, Cr, Mo, or silicides thereof, and so on. They are used as occasion may demand.

Since the present embodiment permits formation of TFTs at low temperature and with high performance, it can realize increase of area and decrease of cost. The low-temperature Poly-SiTFTs were described herein, but there are no specific restrictions on the TFTs. It can also be contemplated that the high-performance poly-SiTFTs are prepared by ion implantation or by the solid phase growth method, thereby forming the circuits also including the peripheral circuits. The TFTs do not have to be limited particularly to the high-performance Poly-SiTFTs, but they may be the ordinary Poly-SiTFTs or a-SiTFTs, though their performance is lower. However, the cost is decreased by use of such TFTs. It is, therefore, needless to mention that such TFTs are not contrary to the essence of the present invention.

After patterning of the electrode layer, an interlayer insulator 601 was further formed. This was subjected to the flattening process using SOG, TEOS, or CMP as in Embodiment 1. A non-transparent metal 602 was next formed as a shielding film and then patterned (for example, Ti was deposited by sputtering). Then an insulating film 109 as a capacitor film was formed, for example, by decomposing silane gas and ammonia gas or mixed gases of silane gas and $N_2O$ at the temperature of 200 to 400° C. in the plasma and thereafter thermally treated at the temperature of 350 to 500° C. in hydrogen gas or mixed gases of hydrogen gas with inert gas such as nitrogen gas for 10 to 240 minutes to hydrogenate polycrystal silicon. An insulating film 605 like SiO was again deposited and patterned to form through holes. After that, the pixel electrode layer 508 was deposited. The present embodiment employs ITO for this transparent electrode layer, but the invention is not limited to this. After that, the surface of the pixel electrode layer was flattened by CMP in the same manner as described in Embodiment 1. The vertical alignment layer was formed on the surface of the base substrate thus formed, by the following method.

First, the surface was treated with a silane coupling agent and then the vertical alignment layer was formed in the structure of Embodiment 4. After that, the opposite substrate was bonded to the base substrate and thereafter the liquid crystal having the negative dielectric anisotropy was injected into between the substrates. Then the substrates were sealed.

Figure 19:
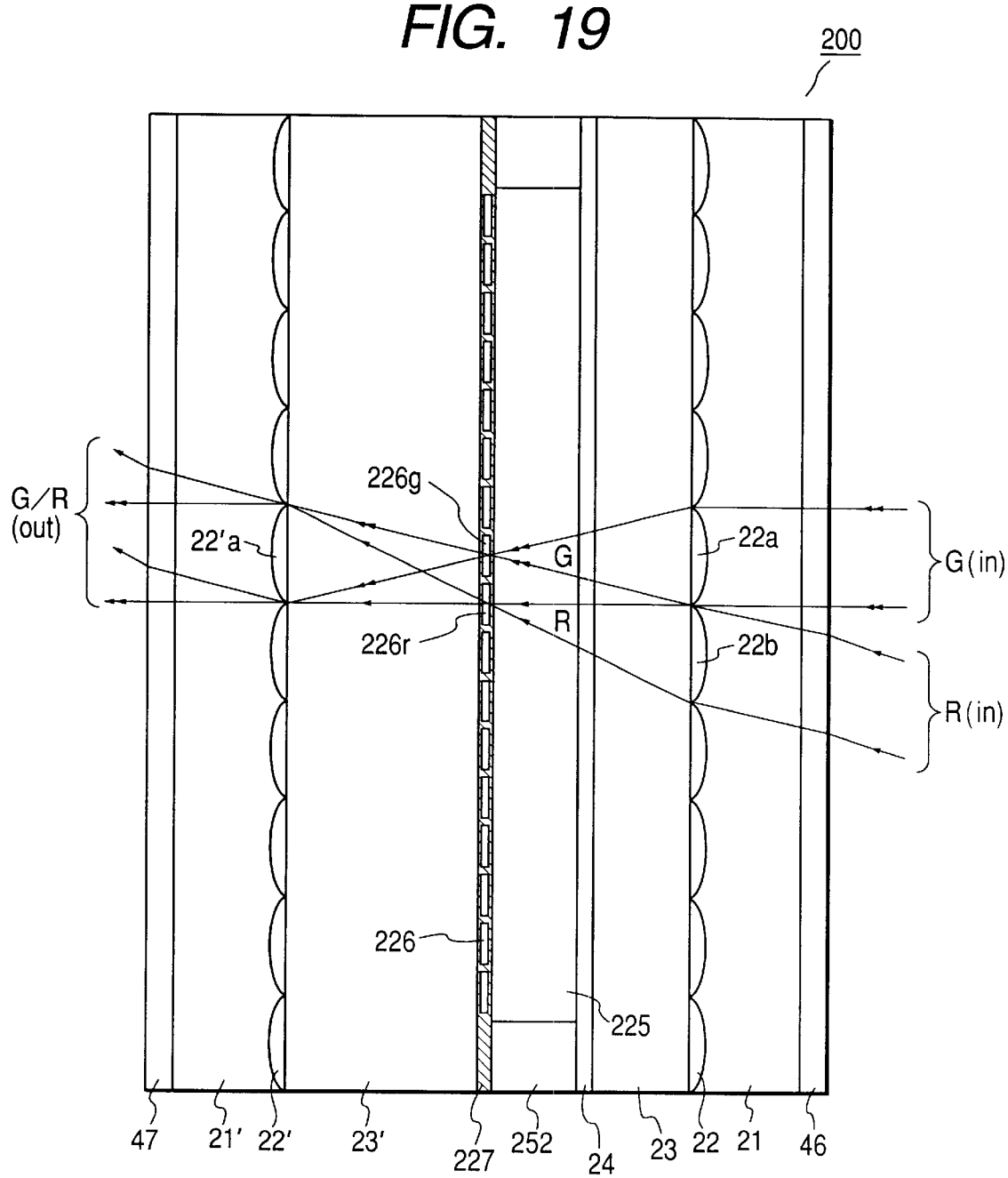
FIG. 19 is a sectional view of a liquid crystal panel to show the fourth embodiment of the present invention.

Next described is the liquid crystal panel according to the present invention used herein. FIG. 19 is a schematic diagram to show an enlarged cross section (corresponding to the yz plane of FIG. 3) of the liquid crystal panel 200. In FIG. 19, 21, 21' represent microlens substrates, 22, 22' microlenses, 23 23' glass sheets, 24 a transparent opposite electrode, 225 a DAP liquid crystal layer, 226 a transparent pixel electrode layer, 227 an active matrix driving circuit section, and 46, 47 polarizers placed in the cross Nicol relation.

The microlenses 22, 22' are formed on the surface of each glass substrate (alkaline glass) 21, 21' by the so-called ion exchange method and are arrayed in the two-dimensional array structure at the pitch equal to double the pitch of the pixel electrodes 226. The glass sheet 23, 23' is bonded onto each microlens array. The liquid crystal layer 225 adopts the nematic liquid crystal of the DAP mode and is maintained in the predetermined alignment by the alignment layers not illustrated. The pixel electrodes 226 are made of ITO and formed on the glass sheet 23'.

The active matrix driving circuit section 227 includes so-called TFT circuits based on so-called amorphous silicon or polysilicon thin film, which activate the pixel electrodes 226 by the active matrix drive and which are formed on the glass sheet 23' in the layout as illustrated in FIG. 20. FIG. 20 is a specific wire diagram, in which numerals 301, 302, 303 represent video lines for B, G, and R signals, respectively, 310 a gate line, 321 to 323 switching TFTs for the R, G, and B liquid crystal pixels, respectively, and 226r, 226g, and 226b transparent pixel electrodes of R, G, and B, respectively.

In the peripheral portion of the circuit matrix there are provided gate line drivers (the vertical register etc.) and signal line drivers (the horizontal register etc.) not illustrated. These peripheral drivers and active matrix driving circuits are arranged so as to write video signals of the respective primary colors of R, G, and B into predetermined corresponding R, G, B pixels. Each pixel electrode 226 does not have a color filter, but the pixel electrodes 226 are discriminated from each other as an R, G, or B pixel by a primary color video signal written by the active matrix driving circuit, thereby forming the predetermined R, G, B pixel array described hereinafter.

Let us check here the G light which illuminates the liquid crystal panel 200. As described previously, the G light is incident normally to the liquid crystal panel 200. Among rays of the G light, rays incident into one microlens 22a are indicated by arrows G (in) in FIG. 19. As illustrated herein, the G rays are condensed by the microlens 22 to illuminate an area on the G pixel electrode 226g. After the G rays travel through the liquid crystal layer 225, they then travel through the microlens 22'a on the TFT side this time to leave the liquid crystal panel. While passing through the liquid crystal layer 225 in this way, the G rays (polarized by the polarizer 46) are modulated according to the operation of the liquid crystal under an electric field established between the pixel electrode 226g and the opposite electrode 24 by a signal voltage applied to the pixel electrode 226g and then leave the liquid crystal panel.

Here, the quantity of light passing through the polarizer 47 and traveling toward the projection lens 1 varies depending upon the degree of the modification, thereby accomplishing the so-called density gradation display of each pixel. On the other hand, the R light is incident obliquely in the illustrated cross section (the yz plane) as described previously, and is also polarized by the polarizer 46. For example, focusing attention on R rays incident, for example, into the microlens 22b, as indicated by arrows R (in) in the figure, the R rays illuminate an area on the R pixel electrode 226r which is located at a position shifted below from immediately below the converging point by the microlens 22b. After passing through the R pixel electrode 226r, the R rays also travel through the microlens 22'a on the TFT side as illustrated and then leave the panel (G/R (out)).

On this occasion, the R rays (polarized light) are also modulated according to the operation of the liquid crystal under an electric field established between the R pixel electrode 226r and the opposite electrode 24 by a signal voltage applied to the R pixel electrode 226r, and then leave the liquid crystal panel. The process thereafter is the same as in the case of the aforementioned G light, and the R light is projected as part of image light.

Incidentally, it appears in the illustration of FIG. 19 that the color beams of G light and R light overlap and interfere with each other in part above the G pixel electrode 226g and above the R pixel electrode 226r, but this is because of enlargement and emphasis of illustration of the thickness of the liquid crystal layer in a schematic way. In practice, the thickness of the liquid crystal layer is approximately 5 µm, which is extremely thinner than 50 to 100 µm of the glass sheet, and, therefore, such interference will not occur irrespective of the pixel size.

In the above liquid crystal display device the image characteristics after projection were good, the high-contrast display characteristics specific to the DAP mode were achieved, and the in-plane uniformity was also good.

As described above, the projection type liquid crystal display device according to the present invention is arranged so that the reflected light beams after modulated by the liquid crystal from one set of R, G, and B pixels composing one picture element travel through the same microlens to leave the panel, using the microlens-integrated reflective liquid crystal panel and the optical system for illuminating the liquid crystal panel with the beams of the respective primary colors from the mutually different directions, whereby the display device can project and display a good color image without the RGB mosaic pattern and with high quality. Since the beams from the respective pixels pass through the microlenses twice to be nearly paralleled, a bright projected image can be obtained on the screen even by use of a cheap projection lens having a small numerical aperture.

Further, flattening of the surface of the above active matrix substrate permits stable formation of the vertical alignment layer and production of the high-contrast liquid crystal display device.

Further, the liquid crystal panel of the DAP mode can be formed with high reliability, with little peeled-off layer, and with vertical alignment of the liquid crystal and uniform pretilt angles, by employing the structure wherein the vertical alignment layer is of the multilayer structure in which the film on the base metal electrode layer has high adhesion and high wettability thereto and in which the outermost film in contact with the liquid crystal has the lower surface energy.

What is claimed is:

1. A liquid crystal display device comprising:
   a matrix substrate in which a plurality of light-reflecting pixel electrodes are arrayed in a matrix pattern in correspondence to colors of R (Red), G (Green), and B (Blue);
   an opposite substrate in which an opposite electrode is placed opposite to said pixel electrodes; and
   a liquid crystal material having negative dielectric anisotropy, said liquid crystal material being placed between said matrix substrate and said opposite substrate,
   wherein there are provided an alignment layer of polyimide with a vertical alignment property, a microlens array having a plurality of microlenses provided on said opposite substrate, each of said plurality of microlenses being provided at a pitch of two pixels relative to an array of said pixel electrodes, and wherein incident light is introduced through said microlens array, reflected by said plurality of pixel electrodes, and output through said microlens array for forming an image.

2. The liquid crystal display device according to claim 1, wherein said alignment layer comprises a plurality of films.

3. The liquid crystal display device according to claim 2, wherein surface energy of an outermost film in contact with the liquid crystal out of said plurality of films is the smallest out of those of the plurality of films.

4. The liquid crystal display device according to claim 1, wherein said pixel electrodes are flattened.

5. A projector comprising the liquid crystal display device according to claim 1.

* * * * *

UNITED STATES PATENT AND TRADEMARK OFFICE
CERTIFICATE OF CORRECTION

PATENT NO. : 6,339,459 B1
DATED : January 15, 2002
INVENTOR(S) : Takeshi Ichikawa et al.

It is certified that error appears in the above-identified patent and that said Letters Patent is hereby corrected as shown below:

Title page,
Item [57], ABSTRACT, line 3, "pattern" should read -- pattern in --.

Drawings,
Sheet 13, Figure 15, "VLUE" should read -- VALUE --.

Column 1,
Line 40, "etc." should read -- etc., --;
Line 49, "(extended" should read -- (eXtended --;
Line 50, "extended" should read -- eXtended --.

Column 6,
Line 32, "450" should read -- 45° --.

Column 7,
Line 31, "mirror 1341" should read -- mirror 1342 --.

Column 8,
Line 39, "register" should read -- register, --;
Line 40, "register" should read -- register, --.

Column 9,
Line 27, "appears" should read -- appear as --.

Column 10,
Line 13, "tanθthereof" should read -- tanθ thereof --;
Line 19, "of," should read -- of --;
Line 61, "RGB" should read -- R, G, B --.

Column 11,
Line 10, "RGB" should read -- R, G, B --;
Line 44, "RGB" should read -- R, G, B --.

Column 15,
Line 7, "non uniformity" should read -- nonuniformity --.

UNITED STATES PATENT AND TRADEMARK OFFICE
CERTIFICATE OF CORRECTION

PATENT NO. : 6,339,459 B1
DATED : January 15, 2002
INVENTOR(S) : Takeshi Ichikawa et al.

It is certified that error appears in the above-identified patent and that said Letters Patent is hereby corrected as shown below:

Column 18,
Line 60, "register" should read -- register, --;
Line 61, "register" should read -- register, --.

Column 20,
Line 7, "RGB" should read -- R, G, B --.

Signed and Sealed this

Seventh Day of May, 2002

Attest:

Attesting Officer

JAMES E. ROGAN
Director of the United States Patent and Trademark Office